United States Patent
Oguma et al.

(10) Patent No.: US 11,626,937 B2
(45) Date of Patent: Apr. 11, 2023

(54) OPTICAL TRANSMISSION APPARATUS AND CONTROL METHOD OF OPTICAL TRANSMISSION APPARATUS

(71) Applicant: NEC Corporation, Tokyo (JP)

(72) Inventors: Takefumi Oguma, Tokyo (JP); Yurie Matsuyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/082,734

(22) PCT Filed: Mar. 13, 2017

(86) PCT No.: PCT/JP2017/009925
§ 371 (c)(1),
(2) Date: Sep. 6, 2018

(87) PCT Pub. No.: WO2017/159596
PCT Pub. Date: Sep. 21, 2017

(65) Prior Publication Data
US 2019/0097749 A1 Mar. 28, 2019

(30) Foreign Application Priority Data
Mar. 18, 2016 (JP) .............................. JP2016-055632

(51) Int. Cl.
*H04J 14/00* (2006.01)
*H04J 14/02* (2006.01)
(Continued)

(52) U.S. Cl.
CPC ........ *H04J 14/0298* (2013.01); *H04B 10/294* (2013.01); *H04J 14/021* (2013.01);
(Continued)

(58) Field of Classification Search
CPC .. H04J 14/0298; H04J 14/0209; H04J 14/021; H04J 14/0221; H04J 14/00;
(Continued)

(56) References Cited

U.S. PATENT DOCUMENTS 6,456,409 B2 * 9/2002 Zhou ................ H04B 10/25073
398/79
6,600,594 B1 * 7/2003 Ko ...................... H01S 3/06754
359/337

(Continued)

FOREIGN PATENT DOCUMENTS

CN 1553618 A 12/2004
EP 1073227 A2 1/2001
(Continued)

OTHER PUBLICATIONS

Notification of Reasons for Refusal issued in Japanese Patent Application No. 2017-039177 dated May 22, 2018, 8 pages.
(Continued)

*Primary Examiner* — Dibson J Sanchez

(57) ABSTRACT

A node (10) includes multiplexing unit (11) that multiplexes a plurality of subcarrier signals for performing optical wavelength multiplexing communication into a wavelength group signal; output unit (12) that outputs the multiplexed wavelength group signal to an optical transmission line; pre-multiplexing level correction unit (13) that corrects a level deviation between the subcarrier signals before the multiplexing based on an optical level of the wavelength group signal in the output unit (12); and post-multiplexing level correction unit (14) that corrects a level deviation of the wavelength group signal after the multiplexing including the corrected subcarrier signals based on the optical level of the wavelength group signal in the output unit (12).

20 Claims, 17 Drawing Sheets

(51) Int. Cl.
*H04B 10/294* (2013.01)
*H04B 10/293* (2013.01)
*H04B 10/07* (2013.01)
*H04B 10/03* (2013.01)

(52) U.S. Cl.
CPC ...... *H04J 14/0209* (2013.01); *H04J 14/0221* (2013.01); *H04B 10/03* (2013.01); *H04B 10/07* (2013.01); *H04B 10/293* (2013.01); *H04J 14/00* (2013.01)

(58) Field of Classification Search
CPC .............. H04J 14/0202; H04J 14/0227; H04B 10/294; H04B 10/03; H04B 10/07; H04B 10/293
USPC ........................................ 398/1–8, 43–103
See application file for complete search history.

(56) References Cited

U.S. PATENT DOCUMENTS

| | | | | |
|---|---|---|---|---|
| 6,654,561 B1* | 11/2003 | Terahara | .......... | H04B 10/07953 398/25 |
| 6,735,395 B1* | 5/2004 | Bai | .......... | H04B 10/504 372/31 |
| 6,738,181 B1* | 5/2004 | Nakamoto | .......... | H04B 10/2525 398/79 |
| 6,760,532 B1* | 7/2004 | Livas | .......... | H04B 10/077 359/337.11 |
| 6,810,214 B2* | 10/2004 | Chbat | .......... | H04B 10/2941 359/337 |
| 6,839,518 B1* | 1/2005 | Minamimoto | .......... | H04B 10/077 398/160 |
| 6,885,499 B1* | 4/2005 | Hoshida | .......... | H04B 10/2942 359/337 |
| 7,181,095 B1* | 2/2007 | Meli | .......... | G02B 6/12019 385/11 |
| 7,542,675 B1* | 6/2009 | Graves | .......... | H04Q 11/0005 398/94 |
| 7,672,585 B2* | 3/2010 | Sone | .......... | H04Q 11/0005 385/16 |
| 8,396,362 B2* | 3/2013 | Nagaki | .......... | H04B 10/40 398/135 |
| 8,554,088 B2* | 10/2013 | Goto | .......... | H04B 10/0797 398/197 |
| 8,818,190 B2* | 8/2014 | Hayashi | .......... | H04B 10/07955 398/34 |
| 2002/0015199 A1* | 2/2002 | Eder | .......... | H04B 10/0775 398/36 |
| 2002/0021463 A1* | 2/2002 | Turner | .......... | H04B 10/077 398/79 |
| 2002/0154359 A1* | 10/2002 | Tsuda | .......... | H04B 10/2942 359/337.13 |
| 2003/0035170 A1* | 2/2003 | DeGrange, Jr. | .... | H04B 10/0775 398/79 |
| 2003/0053175 A1* | 3/2003 | Szczepanek | .......... | H04B 10/0797 398/164 |
| 2003/0099475 A1* | 5/2003 | Nemoto | .......... | H04J 14/0249 398/83 |
| 2003/0147647 A1* | 8/2003 | Funami | .......... | H04J 14/0221 398/79 |
| 2004/0001715 A1* | 1/2004 | Katagiri | .......... | H04B 10/2525 398/81 |
| 2004/0042795 A1* | 3/2004 | Doerr | .......... | G02B 6/12007 398/83 |
| 2004/0081421 A1* | 4/2004 | Mori | .......... | H04B 10/506 385/140 |
| 2004/0120712 A1* | 6/2004 | Ng | .......... | H04B 10/077 398/41 |
| 2004/0161234 A1* | 8/2004 | Ozawa | .......... | H04B 10/2543 398/33 |
| 2004/0179845 A1* | 9/2004 | Yamashita | .......... | H04J 14/0201 398/83 |
| 2004/0228602 A1* | 11/2004 | Livas | .......... | H04B 10/077 385/24 |
| 2004/0247326 A1* | 12/2004 | Iwata | .......... | G02F 1/0123 398/198 |
| 2005/0158057 A1* | 7/2005 | Tomofuji | .......... | H04B 10/2933 398/160 |
| 2005/0220397 A1* | 10/2005 | Oikawa | .......... | H04J 14/02 385/24 |
| 2006/0018658 A1* | 1/2006 | Mori | .......... | H04J 14/0221 398/79 |
| 2006/0024058 A1* | 2/2006 | Nabeyama | .......... | H04B 10/032 398/79 |
| 2006/0045532 A1* | 3/2006 | Yano | .......... | H04B 10/25133 398/147 |
| 2006/0050751 A1* | 3/2006 | Sakamoto | .......... | G01B 11/18 372/32 |
| 2006/0285846 A1* | 12/2006 | Uekama | .......... | H04B 10/0775 398/30 |
| 2007/0230959 A1* | 10/2007 | Kamioka | .......... | H04B 10/506 398/79 |
| 2008/0080865 A1 | 4/2008 | Muro et al. | | |
| 2008/0181612 A1* | 7/2008 | Mills | .......... | H04J 14/0204 398/83 |
| 2008/0260386 A1* | 10/2008 | Boduch | .......... | H04J 14/0204 398/83 |
| 2009/0297143 A1* | 12/2009 | Takeyama | .......... | H04J 14/0221 398/34 |
| 2010/0150563 A1* | 6/2010 | Nakajima | .......... | H04J 14/0221 398/81 |
| 2010/0158532 A1* | 6/2010 | Goto | .......... | H04B 10/07955 398/81 |
| 2011/0243555 A1* | 10/2011 | Callan | .......... | H04B 10/296 398/38 |
| 2012/0230681 A1* | 9/2012 | Ueki | .......... | H04B 10/506 398/34 |
| 2013/0142516 A1* | 6/2013 | Zhou | .......... | H04J 14/0221 398/83 |
| 2013/0188955 A1 | 7/2013 | Sakata | | |
| 2013/0251365 A1* | 9/2013 | Sone | .......... | H04J 14/0201 398/38 |
| 2013/0308945 A1* | 11/2013 | Dhillon | .......... | H04Q 11/0003 398/48 |
| 2015/0249519 A1* | 9/2015 | Terashi | .......... | H04J 14/0221 398/79 |
| 2015/0256252 A1* | 9/2015 | Clouet | .......... | H04J 14/0221 398/38 |
| 2016/0134360 A1* | 5/2016 | Tokura | .......... | H04B 10/032 398/5 |
| 2016/0315729 A1* | 10/2016 | Tsuzuki | .......... | H04J 14/0221 |
| 2016/0352449 A1* | 12/2016 | Honda | .......... | H04J 14/0221 |
| 2018/0241472 A1* | 8/2018 | Inada | .......... | H04B 10/25073 |

FOREIGN PATENT DOCUMENTS

| | | |
|---|---|---|
| JP | H09-289348 A | 11/1997 |
| JP | H10-257028 A | 9/1998 |
| JP | H11-196068 A | 7/1999 |
| JP | H11-298408 A | 10/1999 |
| JP | H11-511619 A | 10/1999 |
| JP | 2000-115132 A | 4/2000 |
| JP | 2000-209152 A | 7/2000 |
| JP | 2001-044970 A | 2/2001 |
| JP | 2001-053686 A | 2/2001 |
| JP | 2004-007813 A | 1/2004 |
| JP | 2006-101470 A | 4/2006 |
| JP | 2006-115546 A | 4/2006 |
| JP | 2007-150636 A | 6/2007 |
| JP | 2010-081287 A | 4/2010 |
| JP | 2013-106328 A | 5/2013 |
| JP | 2013-150261 A | 8/2013 |
| JP | 2013-201495 A | 10/2013 |
| JP | 2014-103600 A | 6/2014 |

(56) References Cited

FOREIGN PATENT DOCUMENTS

WO     WO-1997/010658 A1     3/1997
WO     2015/144346 A1     10/2015

OTHER PUBLICATIONS

International Search Report corresponding to PCT/JP2017/009925, dated May 30, 2017, 2 pages.
Extended European Search Report issued in European Patent Application No. 17766596.5, dated Feb. 18, 2019, 8 pages.
Chinese Notification of First Office Action issued in Chinese Patent Application No. 201780015867.6, dated Aug. 27, 2019, 14 pages.
Japanese Notice of Reasons for Refusal issued in Japanese Patent Application No. 2018-238213, dated Mar. 3, 2020, 6 pages.
Japanese Office Communication for JP Application No. 2020-132238 dated Aug. 10, 2021 with English Translation.
Japanese Office Communication for JP Application No. 2021-146036 dated Sep. 6, 2022 with English Translation.

* cited by examiner

OPTICAL TRANSMISSION APPARATUS AND CONTROL METHOD OF OPTICAL TRANSMISSION APPARATUS

CROSS-REFERENCE TO RELATED APPLICATIONS

This application is a national stage application of International Application No. PCT/JP2017/009925 entitled "OPTICAL TRANSMISSION APPARATUS AND CONTROL METHOD OF OPTICAL TRANSMISSION APPARATUS," filed on Mar. 13, 2017, which claims the benefit of the priority of Japanese Patent Application No. JP2016-055632 filed on Mar. 18, 2016, the disclosures of each of which are hereby incorporated by reference in their entirety.

TECHNICAL FIELD

The present disclosure relates to an optical transmission apparatus and a control method of the optical transmission apparatus. More particularly, the present disclosure relates to an optical transmission apparatus which corrects an optical level, and a control method of the optical transmission apparatus.

BACKGROUND ART

As the demand for broadband multimedia communication service such as the Internet and video streaming increases, introduction of a long-distance and large-volume optical fiber communication system to highways and subways is advancing. It is important for such an optical transmission system which uses optical fibers to enhance transmission efficiency of each optical fiber. Therefore, wavelength division multiplex (WDM) communication for multiplexing and transmitting a plurality of optical signals of different wavelengths is widely used.

As a technique related to efficiently increase a transmission volume of WDM communication, super channel (Super-CH: SCH) transmission for arranging a plurality of subcarrier signals at narrow frequency intervals and grouping a plurality of subcarrier signals is known. For example, Patent Literature 1 discloses a technique of reducing deterioration of SCH transmission quality based on system information of an optical transmission system.

CITATION LIST

Patent Literature

PTL 1: Japanese Unexamined Patent Application Publication No. 2013-106328

SUMMARY OF INVENTION

Technical Problem

By using the above SCH transmission, it is possible to realize optical transmission of several hundreds of Gbps. However, the SCH transmission such as the related technique causes optical level deviations between subcarriers and between groups including subcarriers and therefore has a problem that transmission characteristics deteriorate.

In view of this problem, an object of the present disclosure is to provide an optical transmission apparatus and a control method of the optical transmission apparatus which can improve transmission characteristics.

Solution to Problem

An optical transmission apparatus according to the present invention includes: a multiplexing unit that multiplexes a plurality of subcarrier signals for performing optical wavelength multiplexing communication into a wavelength group signal; an output unit that outputs the multiplexed wavelength group signal to an optical transmission line; a pre-multiplexing level correction unit that corrects a level deviation between the subcarrier signals before the multiplexing based on an optical level of the wavelength group signal in the output unit; and a post-multiplexing level correction unit that corrects a level deviation of the wavelength group signal after the multiplexing including the corrected subcarrier signals based on the optical level of the wavelength group signal in the output unit.

A method for controlling an optical transmission apparatus according to the present invention includes: a multiplexing unit that multiplexes a plurality of subcarrier signals for performing optical wavelength multiplexing communication into a wavelength group signal; and an output unit that outputs the multiplexed wavelength group signal to an optical transmission line, the method including: correcting a level deviation between the subcarrier signals before the multiplexing based on an optical level of the wavelength group signal in the output unit; and correcting the level deviation of the wavelength group signal after the multiplexing including the corrected subcarrier signals based on the optical level of the wavelength group signal in the output unit.

Advantageous Effects of Invention

The present disclosure can provide an optical transmission apparatus and a control method of the optical transmission apparatus which can improve transmission characteristics.

DESCRIPTION OF EMBODIMENT

Basic Embodiment

First, a basic embodiment which is a base of embodiment will be described.

Figure 1:
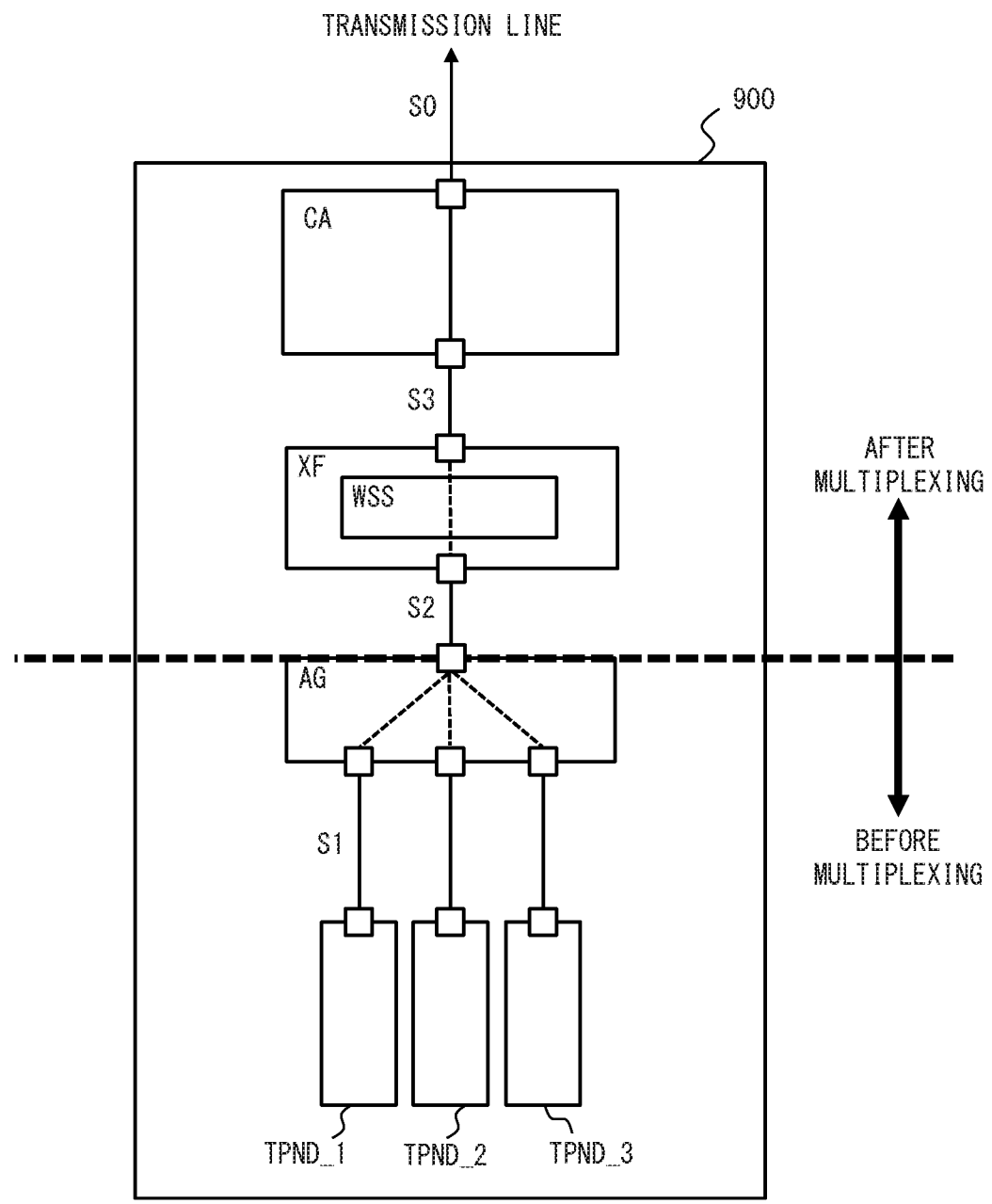
FIG. 1 is a configuration diagram illustrating a schematic configuration of a node according to a basic embodiment.

FIG. 1 illustrates a schematic configuration of a node (optical transmission apparatus) according to the basic embodiment. As illustrated in FIG. 1, a node 900 according to the basic embodiment includes transponders TPND and a multiplexer AG which are components before multiplexing of subcarrier signals, and an optical cross-connect XF and an optical amplifier CA which are components after multiplexing of subcarrier signals. In addition, in this description, "multiplexing" means multiplexing subcarriers in the same wavelength group.

A plurality of transponders TPND (TPND_1 to TPND_3) output subcarrier signals S1 of different wavelengths, and the multiplexer AG multiplexes the subcarrier signals S1 and generates a wavelength group signal S2. The optical cross-connect XF includes a wavelength selection switch WSS which switches the wavelength group signal S2 and generates an SCH signal (including the wavelength group signal S2) S3. The optical amplifier CA amplifies the SCH signal S3 after switching, and outputs an SCH signal S0 to a transmission line.

Figure 2:
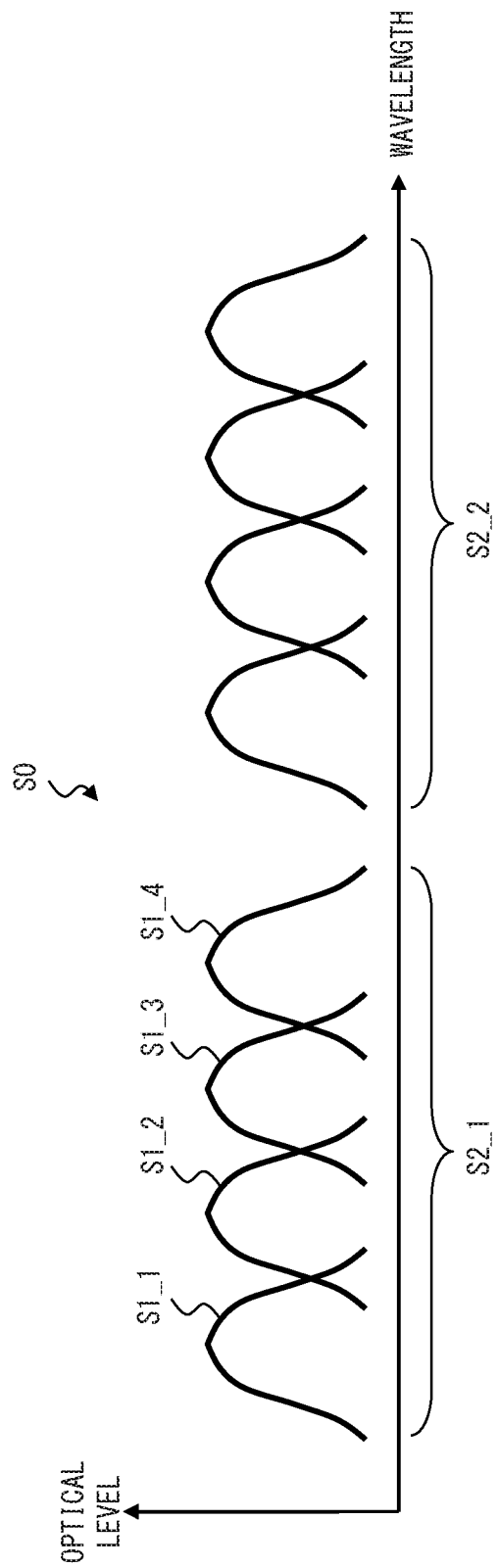
FIG. 2 is a graph illustrating a wavelength band example of an SCH according to the basic embodiment.

FIG. 2 is a graph illustrating a wavelength band of SCH signals used in the basic embodiment. As illustrated in FIG. 2, according to SCH transmission, a plurality of subcarrier signals S1 are arranged at narrow frequency intervals, and are grouped as the one wavelength group signal S2. The wavelength group signal S2 is a set of a plurality of subcarrier signals S1 (including a plurality of subcarrier signals S1), and the same wavelength group signal S2 is added/dropped by the same element (node and the like). In an example in FIG. 2, the one wavelength group signal S2 includes four subcarrier signals S1_1 to S1_4, but may instead include an arbitrary number of subcarrier signals. SCH signals are not limited to two wavelength group signals S2_1 to S2_2, and may instead include an arbitrary number of wavelength group signals.

Figure 3:
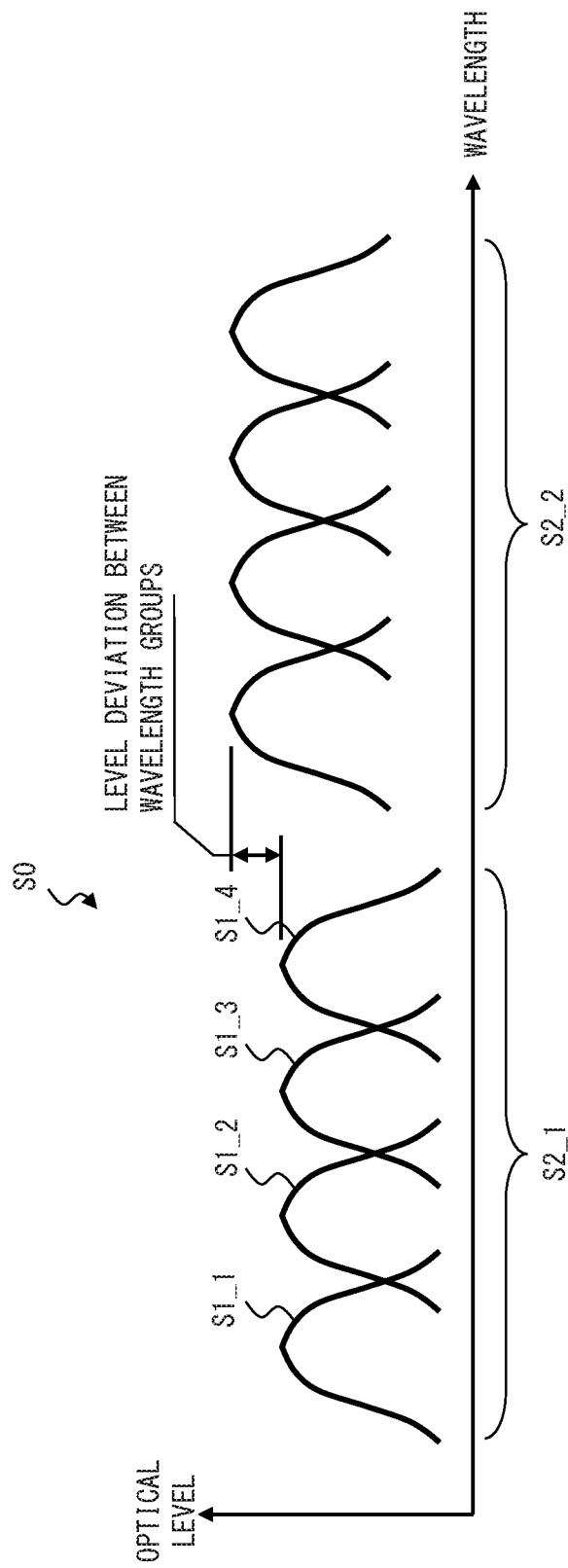
FIG. 3 is a graph illustrating an example of a level deviation of the SCH according to the basic embodiment.
Figure 4:
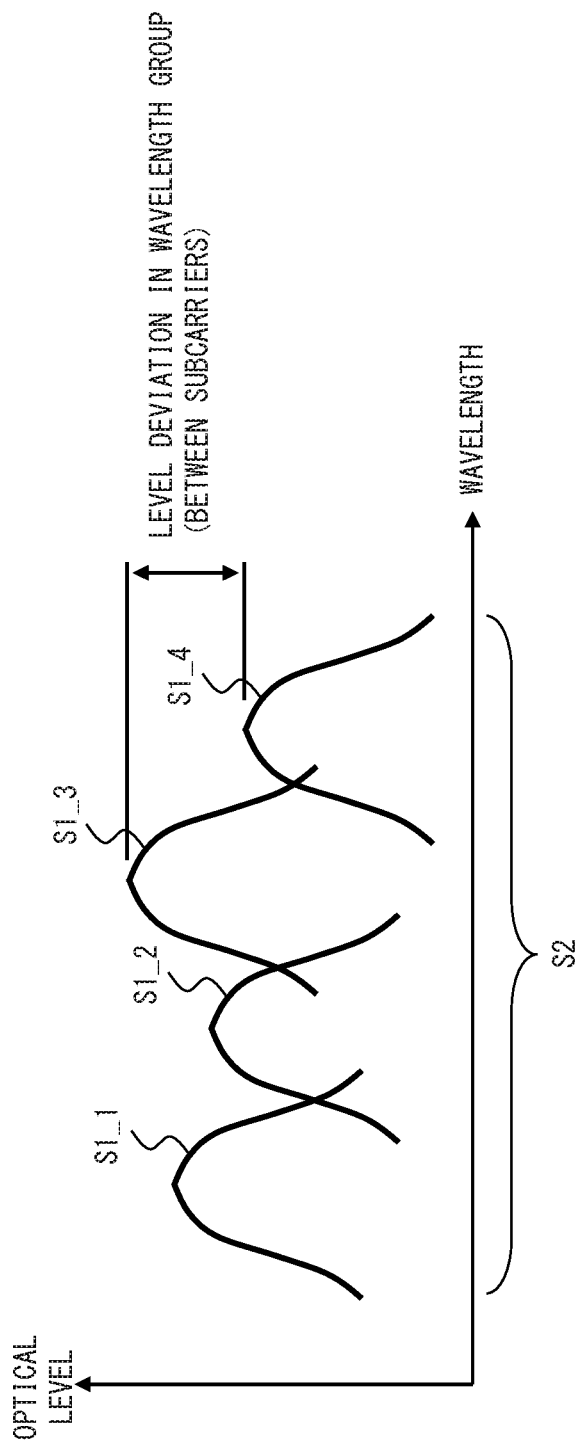
FIG. 4 is a graph illustrating an example of the level deviations of the SCH according to the basic embodiment.

FIGS. 3 and 4 illustrate level deviations which occur in by the SCH signals in the basic embodiment. According to the SCH transmission, a plurality of subcarrier signals S1 constitute the wavelength group signal S2, a plurality of wavelength group signals S2 constitute the SCH signal S0, and therefore level deviations occur in units which constitute respective signals.

As illustrated in FIG. 3, a level deviation occurs as a first level deviation between wavelength groups according to the SCH transmission. The level deviation between the wavelength groups occurs due to a difference in transmission loss caused by a difference in a transmission path of each wavelength group after multiplexing. That is, the optical cross-connect XF of the node receives an input of a plurality of wavelength group signals from a plurality of routes including another node. These wavelength group signals are transmitted through different routes, and therefore a variability (deviate) of optical levels occurs according to a transmission path.

As illustrated in FIG. 4, level deviations occur as second level deviations between subcarriers in the wavelength group according to the SCH transmission. The level deviations between the subcarriers occur due to a difference in transmission loss between the respective subcarriers before multiplexing. That is, the multiplexer AG of the node receives an input of a plurality of subcarrier signals. These subcarrier signals are transmitted via the different transponders, fibers and the like, and therefore the variability of the optical levels occurs due to loss of the transponders, the fibers or the like. There are, for example, output deviations between the transponders TPND, connection loss deviations between the transponders TPND and the multiplexer AG and a loss deviation inside the multiplexer AG.

In addition, the level deviations between the subcarriers occur due to wavelength dependency after multiplexing, too. That is, the optical cross-connect XF receives an input of a wavelength group signal from another node, and an optical fiber cable between nodes has wavelength dependency (SRS tilt). This wavelength dependency influences subcarrier transmission characteristics, and therefore the variability of the optical levels of the subcarriers occurs. Furthermore, there is also a loss deviation due to non-uniformity in wavelength group bands in the optical cross-connect XF (wavelength selection switch WSS) and the optical amplifier CA.

Figure 5:
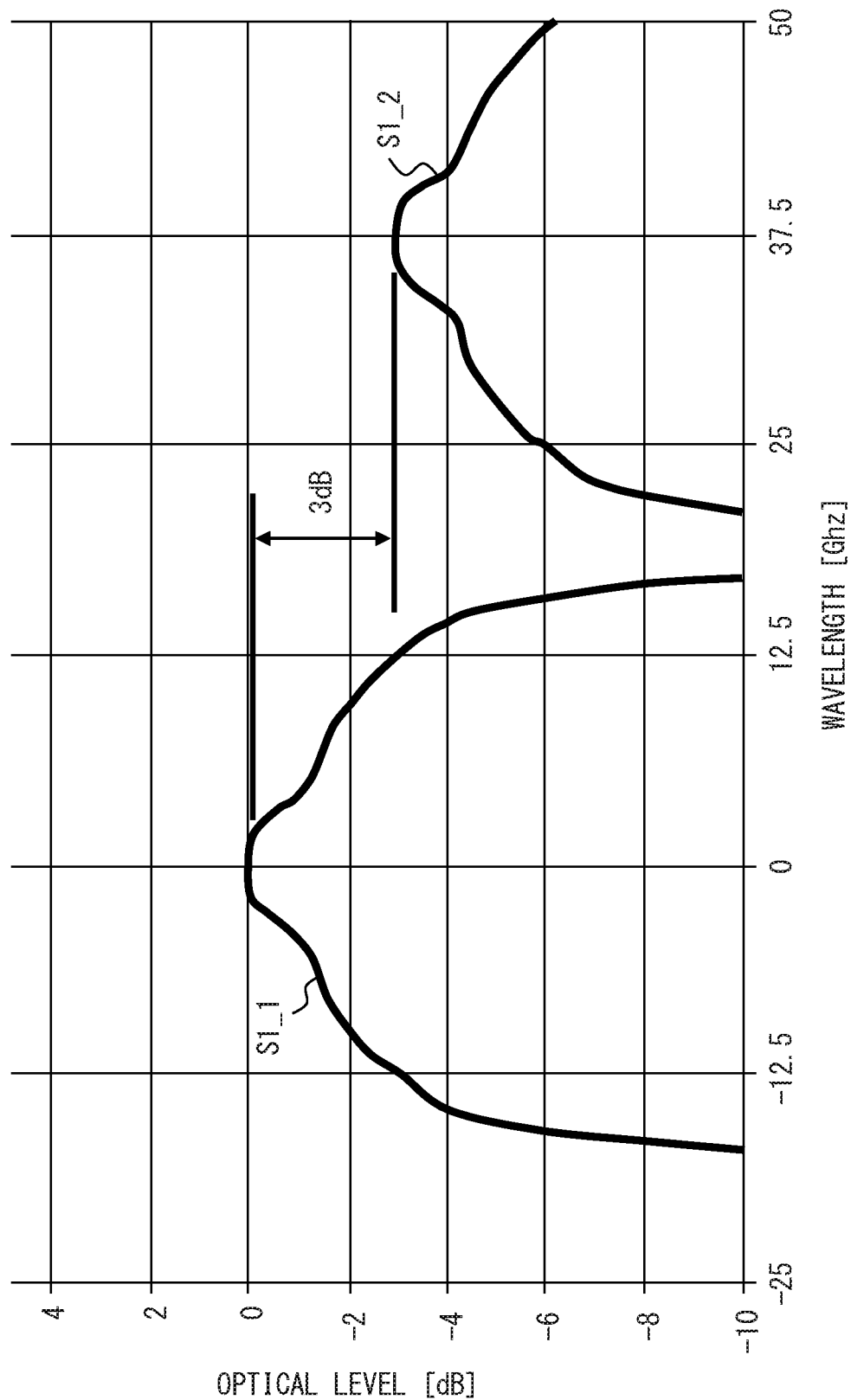
FIG. 5 is a graph for explaining a correction result of the level deviation of the SCH according to the basic embodiment.
Figure 6:
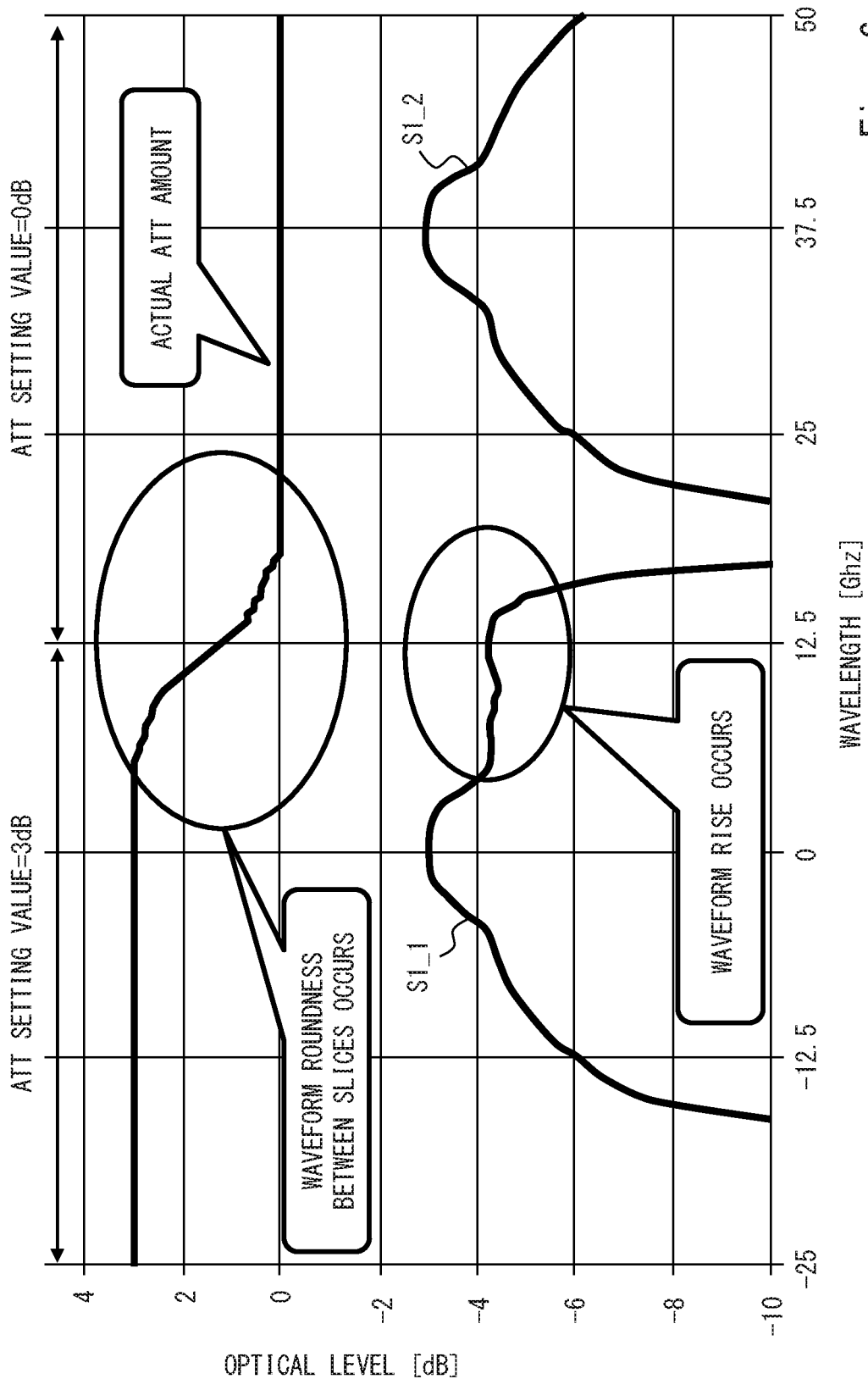
FIG. 6 is a graph for explaining a correction result of the level deviation of the SCH according to the basic embodiment.

In this regard, when a deviation due to a difference in wavelength loss before multiplexing among these level deviations is corrected by level correction (LEQ) after multiplexing, there is a concern that a transmission waveform may deteriorate. FIGS. 5 and 6 illustrate spectral changes before and after correction in a case where a level deviation between wavelength group signals after multiplexing is simply corrected.

FIG. 5 illustrates a spectrum in a state where a deviation between subcarriers occurs before multiplexing. In this example, a difference between the optical levels of the subcarrier signal S1_1 and the subcarrier signal S1_2 is 3 dB.

FIG. 6 illustrates a spectrum in a case where level correction is performed after the signals in FIG. 5 are multiplexed. As illustrated in FIG. 6, to correct the level deviation, for example, a variable optical attenuator of the wavelength selection switch WSS in the optical cross-connect XF is set to attenuate the subcarrier signal S1_1 by 3 dB (decrease 3 dB from S2) and attenuate the subcarrier signal S1_2 by 0 dB (increase 3 dB from S1). Then, waveform roundness occurs in an ATT setting of the variable optical attenuator between subcarriers (Slices). A rise of the waveform of the subcarrier signal S1_1 occurs near the wavelength of this waveform roundness, and therefore signal characteristics (transmission characteristics) deteriorate.

Outline of Embodiment

As described above, according to the SCH transmission, two level deviations occur. Therefore, it is necessary to perform correction of a level deviation between wavelength groups and correction of level deviations between subcarriers in the wavelength as level correction. Hence, the embodiment provides means for correcting optical level deviations between wavelength groups and subcarriers which are a problem of the SCH transmission to realize good transmission characteristics.

Figure 7:
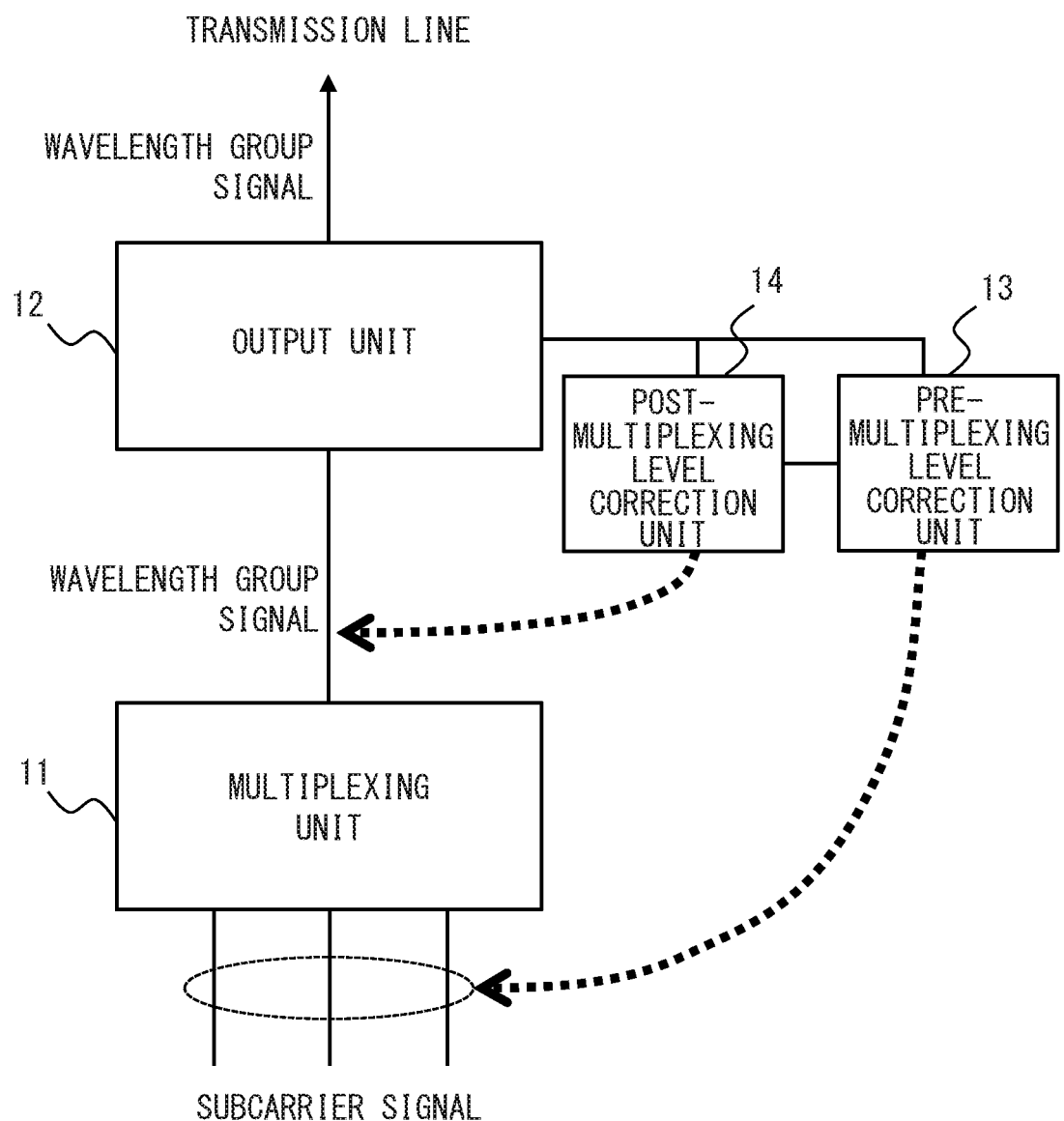
FIG. 7 is a configuration diagram for explaining an outline of a node according to an embodiment.

FIG. 7 illustrates an outline of a node (optical transmission apparatus) 10 according to the embodiment. As illustrated in FIG. 7, the node 10 according to the embodiment includes a multiplexing unit 11, an output unit 12, a pre-multiplexing level correction unit 13 and a post-multiplexing level correction unit 14.

The multiplexing unit 11 multiplexes a plurality of subcarrier signals for performing optical wavelength multiplexing communication into a wavelength group signal. The output unit 12 outputs the wavelength group signal multiplexed by the multiplexing unit 11 to an optical transmission line. The pre-multiplexing level correction unit 13 corrects level deviations between subcarrier signals before multiplexing performed by the multiplexing unit 11, based on an optical level of the wavelength group signal in the output unit 12. The post-multiplexing level correction unit 14 corrects a level deviation of the wavelength group signal after multiplexing including the subcarrier signals corrected by the pre-multiplexing level correction unit 13 based on the optical level of the wavelength group signal in the output unit 12.

According to the embodiment, as illustrated in FIG. 7, the level deviations between the subcarriers occurred before multiplexing are corrected before multiplexing. The level deviation between the wavelength groups (including the level deviations between the subcarriers included in the wavelength groups) occurred after multiplexing is corrected after multiplexing. Consequently, it is possible to reliably prevent the level deviations from occurring, and improve transmission characteristics.

First Embodiment

The first embodiment will be described below with reference to the drawings. In the present embodiment, an example where a configuration in FIG. 7 is applied to the basic embodiment in FIG. 1 will be described.

Figure 8:
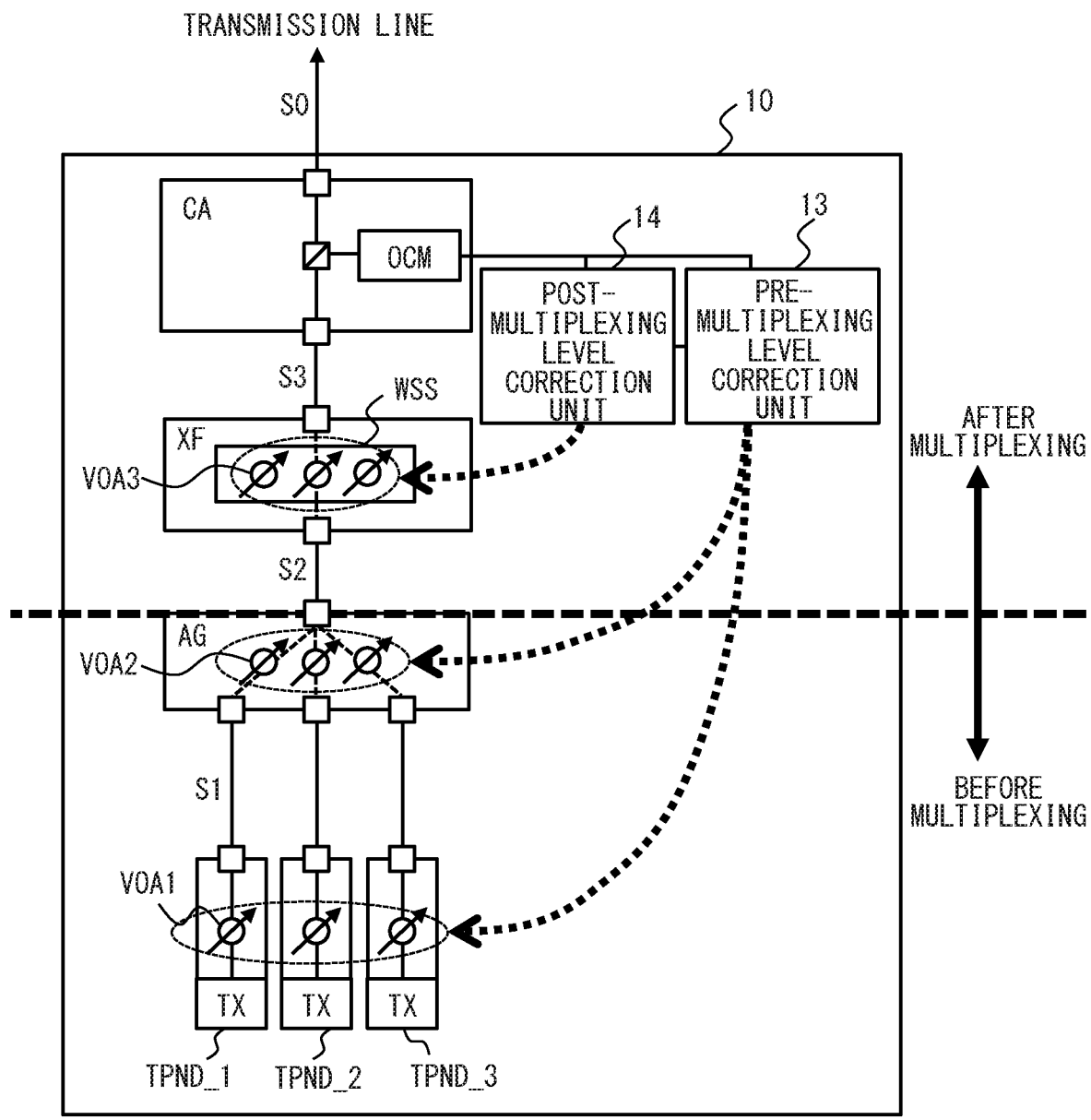
FIG. 8 is a configuration diagram illustrating a schematic configuration of a node according to a first embodiment.

FIG. 8 illustrates a schematic configuration of a node according to the present embodiment. Similar to the above basic embodiment, as illustrated in FIG. 8, a node 100 according to the present embodiment includes a plurality of transponders TPND (TPND_1 to TPND_3), a multiplexer AG, an optical cross-connect XF and an optical amplifier CA, and further includes an optical channel monitor OCM, a pre-multiplexing level correction unit 13 and a post-multiplexing level correction unit 14. The pre-multiplexing level correction unit 13 and the post-multiplexing level correction unit 14 may be one control unit or may be included in the optical amplifier CA or the like.

The transponders TPND_1 to TPND_3 are optical transmission units which generate a plurality of subcarrier signals S1 for performing SCH transmission (optical wavelength multiplexing communication), and output a plurality of generated subcarrier signals S1 to the multiplexer AG. For example, each transponder TPND includes a laser TX which is a light source, and a variable optical attenuator VOA1 which controls an optical level of an optical signal from the laser TX.

The multiplexer AG is a multiplexing unit which multiplexes the subcarrier signals S1 from the transponders TPND_1 to TPND_3, generates a wavelength group signal S2 and outputs the generated wavelength group signal S2 to the optical cross-connect XF. For example, the multiplexer AG includes variable optical attenuators VOA2 which control an optical level of each subcarrier signal S1.

The optical cross-connect XF is an optical switch unit which includes a wavelength selection switch WSS, and causes this wavelength selection switch WSS to switch an output destination of the wavelength group signal S2 (including a wavelength group signal inputted from another node) outputted from the multiplexer AG, generates an SCH signal (including the wavelength group signal S2) S3 and outputs the generated SCH signal to the optical amplifier CA. For example, the wavelength selection switch WSS in the optical cross-connect XF includes variable optical attenuators VOA3 which control an optical level of each subcarrier signal of the wavelength group signal.

The optical amplifier CA is an output unit which amplifies the SCH signal S3 (including the wavelength group signal) from the optical cross-connect XF, generates an SCH signal S0 and outputs the generated SCH signal S0 to the optical transmission line. The optical channel monitor OCM is, for example, an optical monitor unit which is disposed in the optical amplifier CA, and monitors the optical level of each subcarrier signal in the wavelength group signal in the SCH signal S0 outputted from the optical amplifier CA.

The pre-multiplexing level correction unit 13 performs correction of level deviations between subcarrier signals in the transponders TPND_1 to TPND_3 or the multiplexer AG as pre-multiplexing level correction based on a monitoring result of the optical level in the optical channel monitor OCM. The post-multiplexing level correction unit 14 performs correction of a level deviation between wavelength group signals in the optical cross-connect XF as post-multiplexing level correction based on the monitoring result of the optical level in the optical channel monitor OCM.

Figure 9:
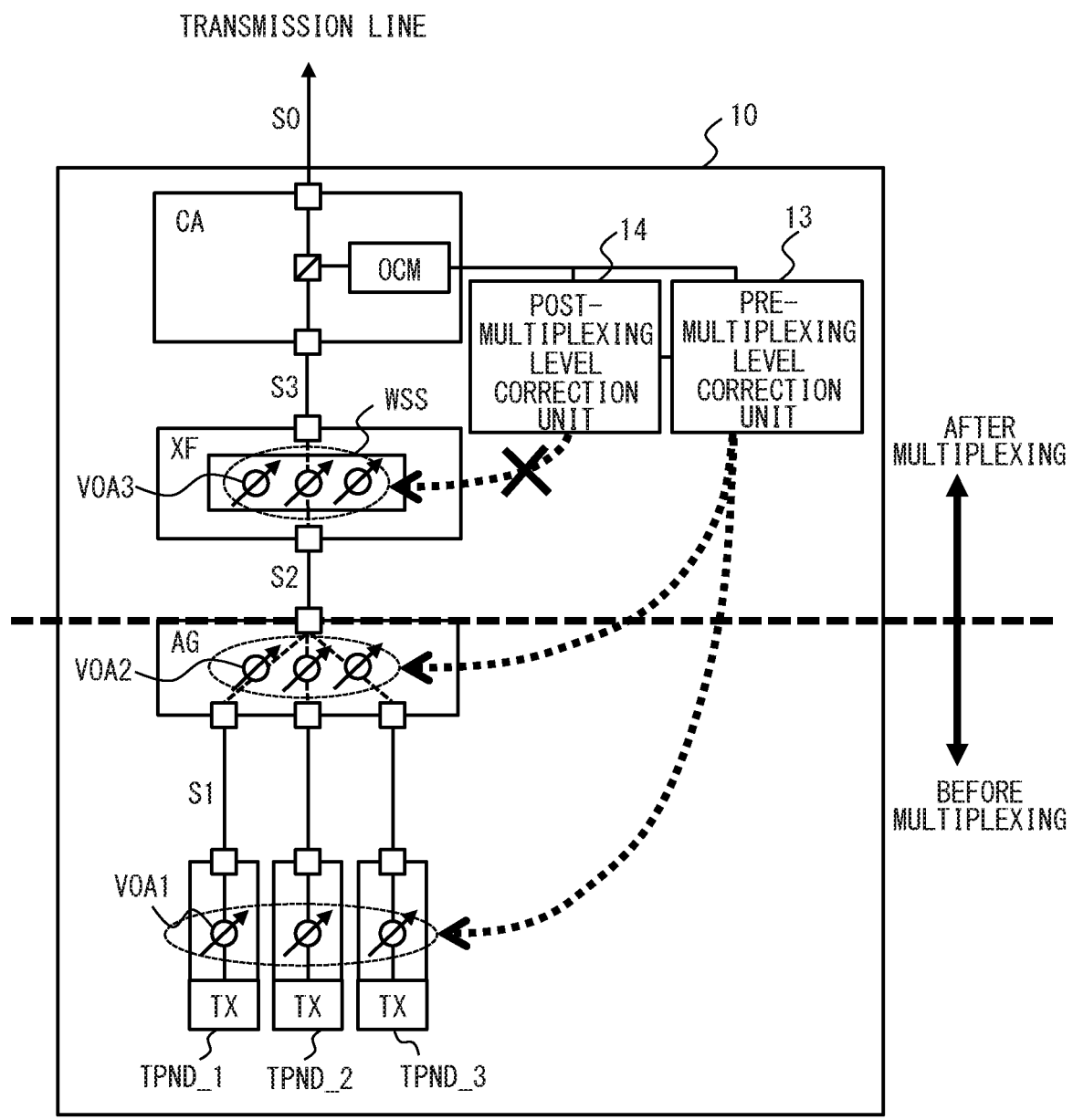
FIG. 9 is a view for explaining a level correcting operation according to the first embodiment.
Figure 10:
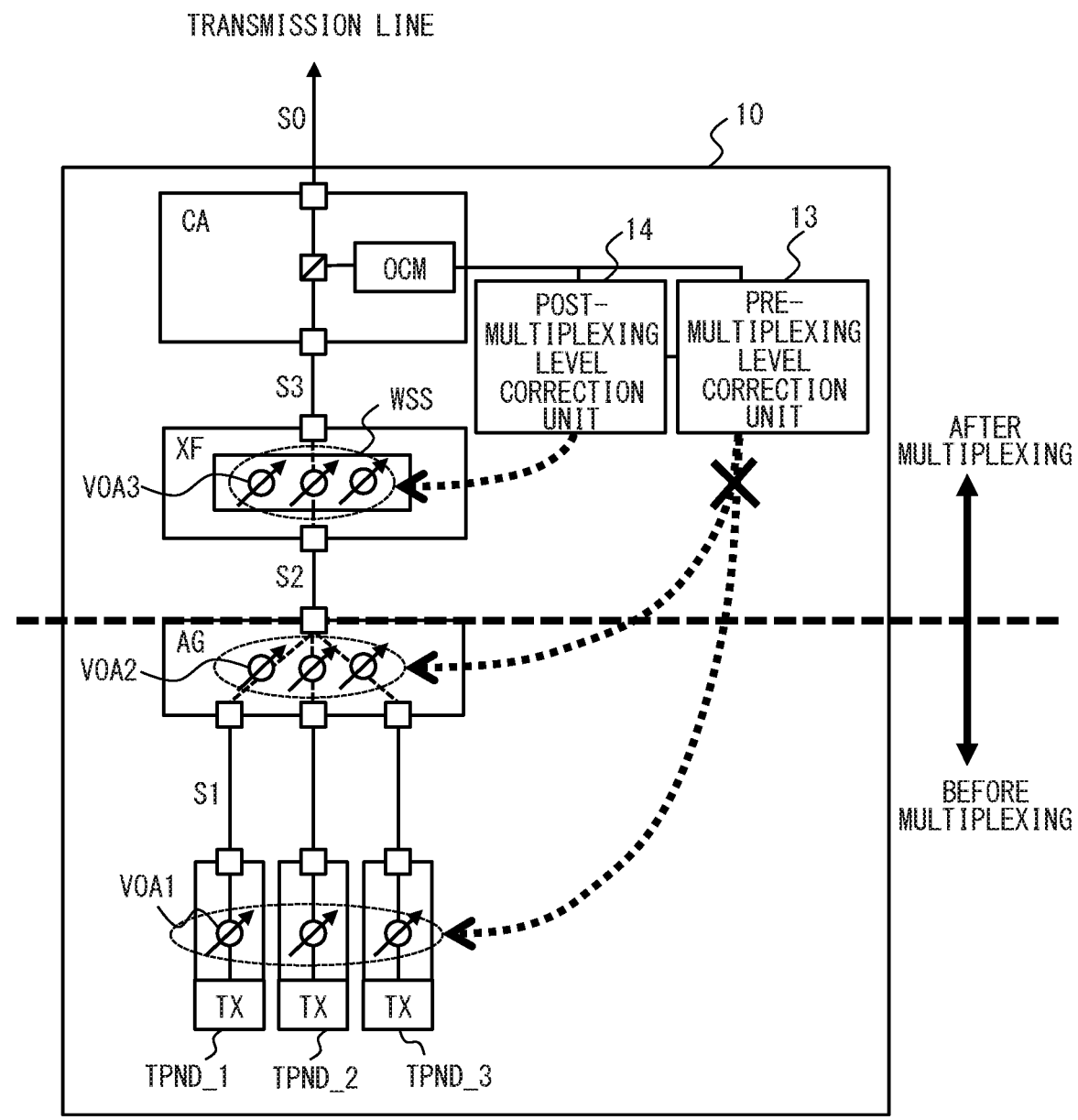
FIG. 10 is a view for explaining the level correcting operation according to the first embodiment.

FIGS. 9 and 10 illustrate an operation outline of the node according to the present embodiment, and illustrate a pre-multiplexing level correction method and a post-multiplexing level correction method, respectively.

As illustrated in FIG. 9, according to the pre-multiplexing level correction method, a node output (optical level) of each subcarrier in the wavelength group is returned to the transponder TPND or the multiplexer AG of the corresponding wavelength group from a monitor value (PM value) of the optical channel monitor OCM disposed in the output unit (optical amplifier CA) for a transmission line, and an output adjustment function of the transponder TPND or the multiplexer AG is used to adjust each subcarrier to a desired level (output calibration function: which does not need to be dynamic LEQ).

In this case, feedback control is stopped for the variable optical attenuators VOA inside the optical cross-connect XF (wavelength selection switch) (an initial value setting is kept), and outputs of the variable optical attenuators VOA (or the optical amplifier) in the transponder TPND or the multiplexer AG are adjusted so that the monitor value of each subcarrier of the optical channel monitor OCM becomes uniform (target level).

As illustrated in FIG. 10, according to the post-multiplexing level correction method, the node output of each subcarrier in the wavelength group is returned to the optical cross-connect XF from the monitor value (PM value) of the optical channel monitor OCM disposed in the output unit (optical amplifier CA) for a transmission line, and the output adjustment function of the wavelength selection switch WSS in the optical cross-connect XF is used to adjust each subcarrier of the corresponding wavelength group to a desired level.

In this case, feedback control is stopped for the variable optical attenuators VOA inside the transponders TPND (a value set by the level correction before multiplexing is used), and the outputs of the variable optical attenuators VOA of the optical cross-connect XF (wavelength selection switch WSS) are adjusted so that the monitor value of each subcarrier of the optical channel monitor OCM becomes uniform.

Thus, according to the present embodiment, the output unit of the node monitors optical levels of wavelength group signals (subcarrier signals), corrects levels of the subcarrier signals before multiplexing (e.g., corrects a level of the transponder or the multiplexer) based on the monitoring result of the output unit, and further corrects levels of the wavelength group signals (subcarrier signals) after multiplexing (e.g., corrects a level of the optical cross-connect XF) based on the monitoring result of the output unit. Consequently, it is possible to perform level deviation correction between wavelength groups and level deviation correction between subcarriers in the wavelength groups, so that it is possible to improve transmission characteristics.

Second Embodiment

The second embodiment will be described below with reference to the drawings. In the present embodiment, a specific example of an optical transmission system including a node will be described.

Figure 11:
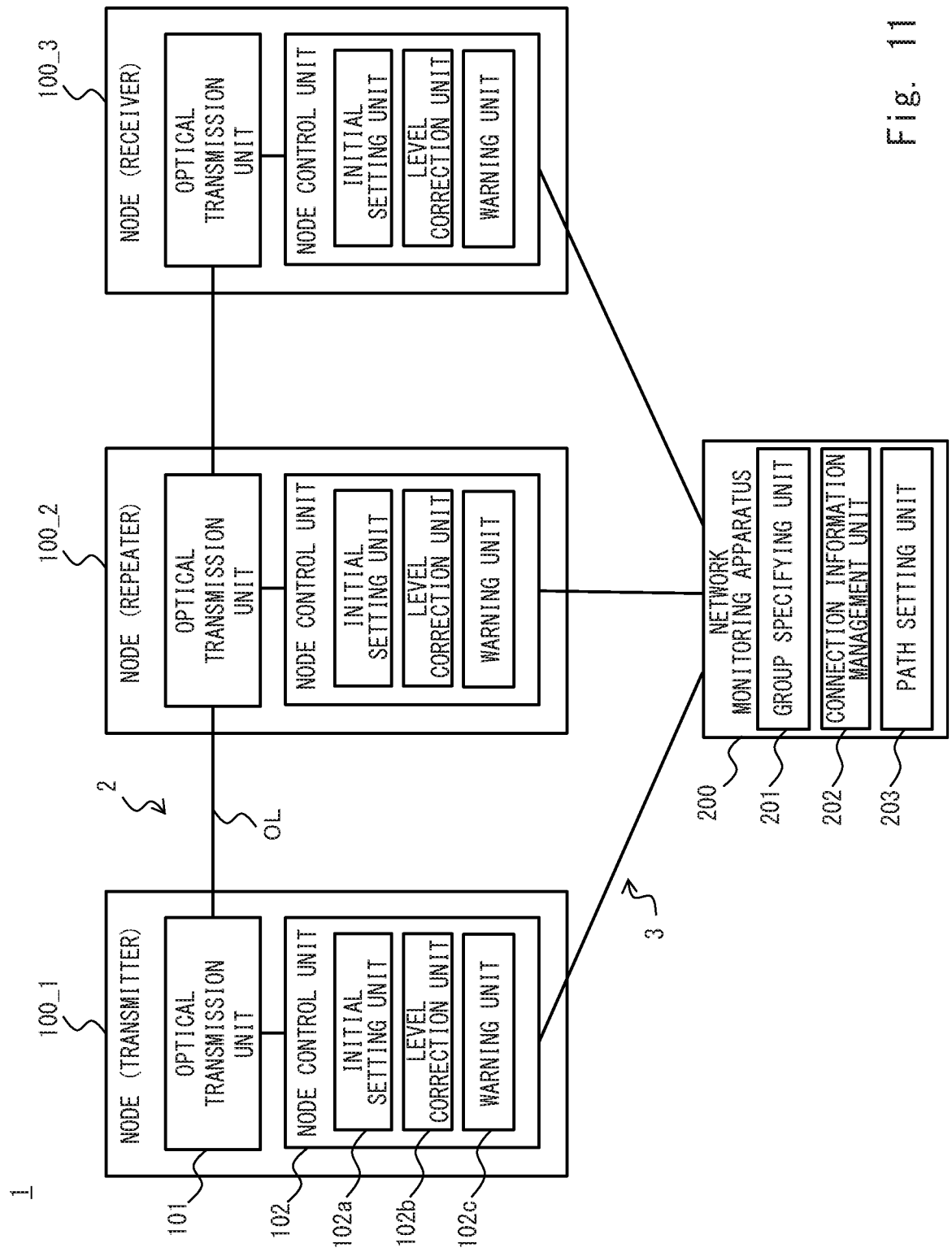
FIG. 11 is a configuration diagram illustrating a configuration example of an optical transmission system according to a second embodiment.

FIG. 11 illustrates a configuration example of the optical transmission system according to the present embodiment. As illustrated in FIG. 11, an optical transmission system 1 according to the present embodiment includes a plurality of nodes (optical transmission apparatuses) 100 (100_1 to 100_3) and a network monitoring apparatus (NMS: Network Management System) 200. The optical transmission system 1 is not limited to the three nodes 100_1 to 100_3, and instead may include an arbitrary number of nodes.

The nodes 100_1 to 100_3 are connected via optical transmission lines OL such as optical fibers, and can perform SCH transmission via the optical transmission lines OL. The nodes 100_1 to 100_3 constitute a WDM (SCH) network 2. For example, the WDM network 2 is a linear network, but it instead may be a network of having another topology, such as a ring network and a mesh network. For example, the node 100_1 is a transmitter which is an optical path transmission end, the node 100_2 is a repeater which relays the optical path, and the node 100_3 is a receiver which is an optical path reception end.

Each node 100 employs basically the same configuration, and includes an optical transmission unit 101 which performs SCH transmission via the optical transmission line OL, and a node control unit 102 which performs control such as setting of the optical transmission unit 101 under control of the network monitoring apparatus 200. In addition, the node control unit 102 may be provided inside the optical transmission unit 101 (or in the same block as the optical transmission unit 101).

The node control unit 102 includes, for example, an initial setting unit 102a which makes an initial setting of the optical transmission unit 101, a level correction unit 102b which corrects a level of a wavelength group signal (subcarrier signals), and a warning unit 102c which detects a failure of an optical signal and outputs a warning to the network monitoring apparatus 200.

The network monitoring apparatus 200 is a monitoring apparatus (control apparatus) which monitors (controls) operations of the nodes 100_1 to 100_3. The network monitoring apparatus 200 is connected with the nodes 100_1 to 100_3 via a management network 3 such as a LAN, and manages settings and communication states of the nodes 100_1 to 100_3 via the management network. For example, the network monitoring apparatus 200 includes a group specifying unit 201 which specifies a wavelength group, a connection information management unit 202 which manages connection information of each node 100, and a path setting unit 203 which sets a communication path via each node 100.

Figure 12:
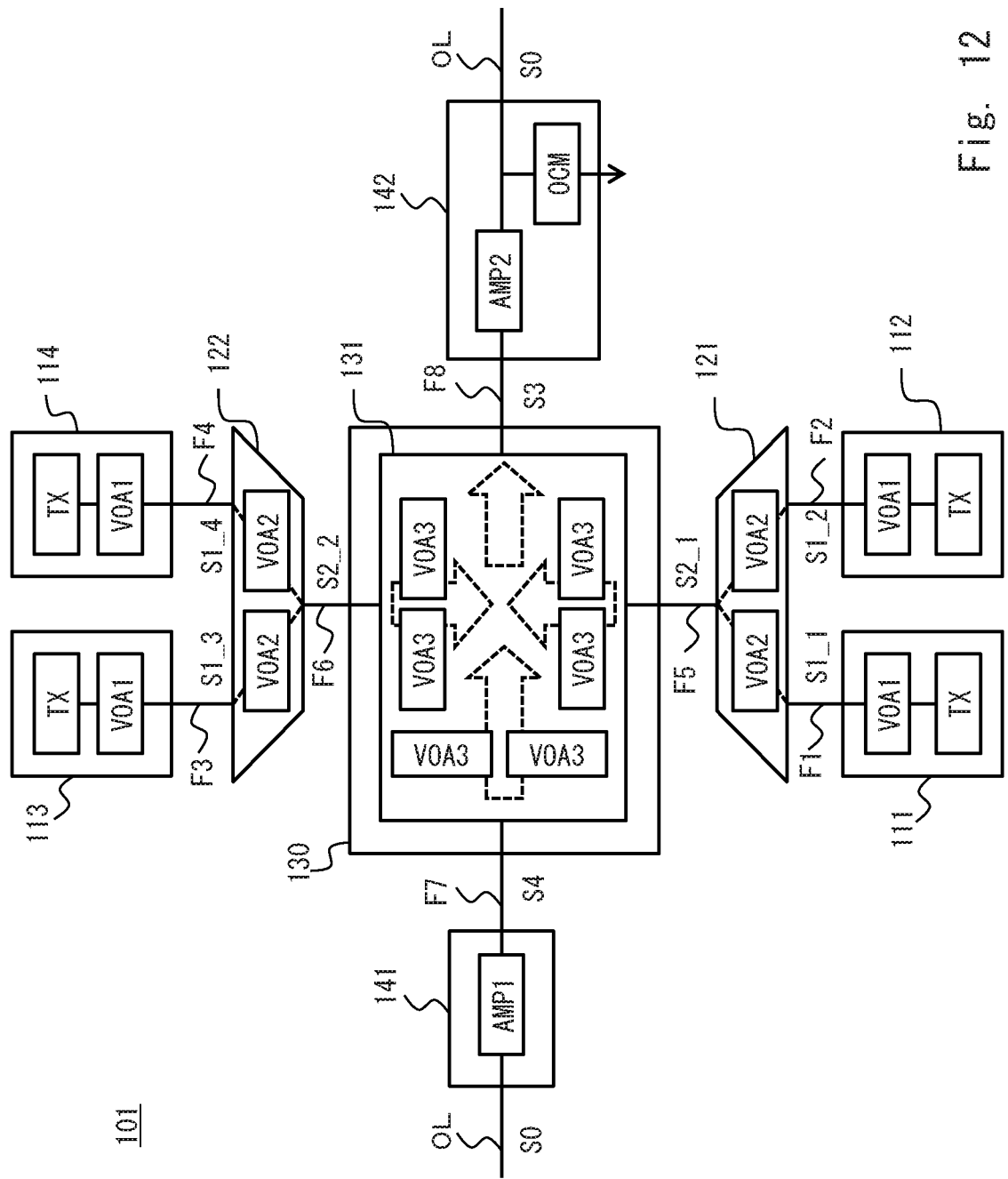
FIG. 12 is a configuration diagram illustrating a configuration example of a node according to the second embodiment.

FIG. 12 illustrates a configuration example of the node (optical transmission unit) according to the present embodiment. FIG. 12 illustrates, for example, a configuration example of the optical transmission unit 101 of the node 100_2 which is the repeater. As illustrated in FIG. 12, the optical transmission unit 101 according to the present embodiment includes transponders 111 to 114, multiplexers 121 and 122, an optical cross-connect 130, an optical input unit 141 and an optical output unit 142. For example, the transponders 111 to 114, the multiplexers 121 and 122, the optical cross-connect 130, the optical input unit 141 and the optical output unit 142 are respectively constituted as independent packages. A plurality of packages constitute the optical transmission unit 101 (node). In addition, any number of transponders, multiplexers, optical cross-connects, optical input units and optical output units may be provided according to subcarriers, wavelength groups paths and the like.

The transponders 111 to 114 are connected with client apparatuses (not illustrated), respectively, and convert signals inputted from the client apparatuses into subcarrier signals S1_1 to S1_4 for SCH transmission and outputs the subcarrier signals S1_1 to S1_4. Each of the transponders 111 to 114 includes a laser TX which is a light source, and a variable optical attenuator VOA1 which controls an optical level of an optical signal from the laser TX.

The multiplexers 121 and 122 multiplex subcarrier signals S1 outputted from the transponders 111 to 114. Each of the multiplexers 121 and 122 includes variable optical attenuators VOA2 which control an optical level of each subcarrier signal. The multiplexer 121 is connected with the transponders 111 and 112 via optical fibers F1 and F2, respectively, and multiplexes the subcarrier signals S1_1 and S1_2 from the transponders 111 and 112, generates a wavelength group signal S2_1 and outputs the wavelength group signal S2_1. The multiplexer 122 is connected with the transponders 113 and 114 via optical fibers F3 and F4, respectively, and multiplexes the subcarrier signals S1_3 and S1_4 from the transponders 113 and 114, generates a wavelength group signal S2_2 and outputs the wavelength group signal S2_2.

The optical cross-connect 130 includes a wavelength selection switch 131. In addition, the optical cross-connect 130 may include a plurality of wavelength selection switches 131 according to paths.

The wavelength selection switch 131 switches (adds or drops) output destinations of optical signals inputted from the multiplexers 121 and 122 and the optical input unit 141 according to a wavelength. The wavelength selection switch 131 includes variable optical attenuators VOA3 which control an optical level of each subcarrier signal in the wavelength group signal. The optical cross-connect 130 (wavelength selection switch 131) is connected with the multiplexers 121 and 122 via optical fibers F5 and F6, respectively, and is connected with the optical input unit 141 and the optical output unit 142 via optical fibers F7 and F8, respectively. The wavelength selection switch 131 switches the wavelength group signal S2_1 from the multiplexer 121, the wavelength group signal S2_2 from the multiplexer 122 and the SCH signal S4 (including the wavelength group) from the optical input unit 141 according to the wavelength, and generates an SCH signal S3. When a switching setting is made to output the wavelength group signals S2_1 and S2_2 and a wavelength group signal of an SCH signal S4, the wavelength selection switch 131 outputs the SCH signal S3 including these signals to the optical output unit 142.

The optical input unit 141 is connected with another node of a transmission end (or the repeater) via the optical transmission line OL, and receives an input of an SCH signal S0 via the optical transmission line OL. For example, the optical input unit 141 includes an optical amplifier AMP1. The optical amplifier AMP1 amplifies the SCH signal S0 (including the wavelength group signal) from the another node, and outputs the SCH signal S0 to the optical cross-connect 130.

The optical output unit 142 is connected with another node of the reception end (or the repeater) via the optical transmission line OL, and outputs the SCH signal S0 via the optical transmission line OL. For example, the optical output unit 142 includes an optical amplifier AMP2 and an optical channel monitor OCM.

The optical amplifier AMP1 amplifies the SCH signal S3 from the optical cross-connect 130, and outputs the amplified SCH signal S0 to the another node. The optical channel monitor OCM monitors the optical level of each subcarrier signal in the wavelength group of the amplified SCH signal S0, and outputs a monitoring result to the node control unit 102. In addition, the node control unit 102 (or part thereof) may be built in the optical output unit 142 or another block (package).

In an example in FIG. 12, based on the optical level of each subcarrier signal in the wavelength group of the SCH signal S0 in the optical output unit 142, level deviations between subcarrier signals before multiplexing (the transponders 111 to 114 and the multiplexers 121 and 122) are corrected, and level deviations between the subcarrier signals (wavelength group signals) after multiplexing (optical cross-connect 130) are corrected.

Figure 13:
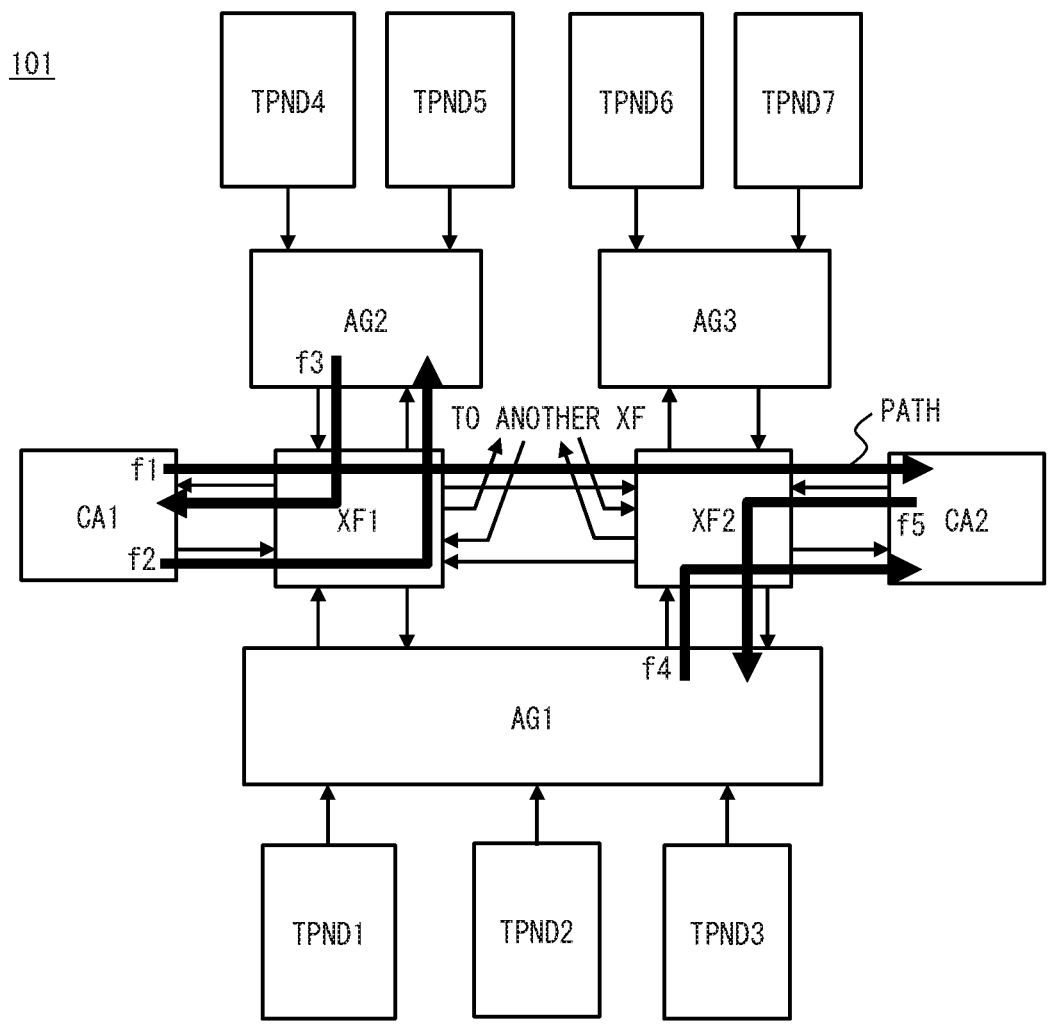
FIG. 13 is a configuration diagram illustrating another configuration example of the node according to the second embodiment.

FIG. 13 illustrates another configuration example of the node (optical transmission unit) according to the present embodiment. In the example in FIG. 13, the optical transmission unit 101 includes transponders TPND1 to TPND7, multiplexers/demultiplexers AG1 to AG3, optical cross-connects XF1 and XF2 and optical amplifiers CA1 and CA2. The optical amplifiers CA1 and CA2 include functions of the optical input unit 141 and the optical output unit 142 in FIG. 12.

The multiplexer AG1 multiplexes subcarrier signals from the transponders TPND1 to TPND3, outputs the subcarrier signals to the optical cross-connect XF1 or XF2, and demultiplexes the wavelength group signal from the optical cross-connect XF1 or XF2. The multiplexer AG2 multiplexes subcarrier signals from the transponders TPND4 and TPND5, outputs the subcarrier signals to the optical cross-connect XF1, and demultiplexes the wavelength group signal from the optical cross-connect XF1. The multiplexer AG3 multiplexes subcarrier signals from the transponders TPND6 and TPND7, outputs the subcarrier signals to the optical cross-connect XF2, and demultiplexes the wavelength group signal from the optical cross-connect XF2.

The optical cross-connect XF1 switches the wavelength group signals (SCH signals) from the multiplexers AG1 and AG2, the optical amplifier CA1 and the optical cross-connect XF2 (and the other optical cross-connect XF), and outputs the wavelength group signals to one of paths. The optical cross-connect XF2 switches the wavelength group signals (SCH signals) from the multiplexers AG1 and AG3, the optical amplifier CA2 and the optical cross-connect XF1 (and the optical cross-connect XF), and outputs the wavelength group signals to one of paths.

As illustrated in FIG. 13, in this example, the wavelength group signal of a wavelength f1 is transmitted through a path via the optical amplifier CA1-the optical cross-connect XF1-the optical cross-connect XF2-the optical amplifier CA2. The wavelength group signal of a wavelength f2 is transmitted through a path via the optical amplifier CA1-the optical cross-connect XF1-the multiplexer AG2. The wavelength group signal of a wavelength f3 is transmitted through a path via the multiplexer AG2-the optical cross-connect XF1-the optical amplifier CA1. The wavelength group signal of a wavelength f4 is transmitted through a path via the multiplexer AG1-the optical cross-connect XF2-the optical amplifier CA2. The wavelength group signal of a wavelength f5 is transmitted through a path via the optical amplifier CA2-the optical cross-connect XF2-the multiplexer AG1.

Signals outputted from the optical amplifiers CA1 and CA2 to an optical transmission line among these wavelength group signals are application targets of the present embodiment.

The optical amplifier CA1 outputs the wavelength group signal of the wavelength f3, and therefore the optical channel monitor OCM of the optical amplifier CA1 monitors the optical level of each subcarrier signal in the wavelength group signal of the wavelength f3. Based on this monitoring result, level deviations between the subcarrier signals before multiplexing (the transponders TPND4 and TPND5 and the multiplexer AG2) are corrected, and level deviations between subcarrier signals (wavelength group signal) after multiplexing (optical cross-connect XF1) are corrected.

The optical amplifier CA2 outputs the wavelength group signals of the wavelengths f1 and f4, and therefore the optical channel monitor OCM of the optical amplifier CA2 monitors the optical level of each subcarrier signal in the wavelength group signals of the wavelengths f1 and f4. Based on this monitoring result of the wavelength f4, level deviations between the subcarrier signals before multiplexing (the transponders TPND1 to TPND3 and the multiplexer AG1) are corrected, and level deviations between subcarrier signals (wavelength group signal) after multiplexing (optical cross-connect XF2) are corrected. The wavelength group signal of the wavelength f5 is not multiplexed in the node (optical transmission unit 101). Therefore, level deviations between subcarrier signals (wavelength group signal) after multiplexing (optical cross-connects XF1 and XF2) are corrected based on a monitoring result of the wavelength f5.

Figure 14A:
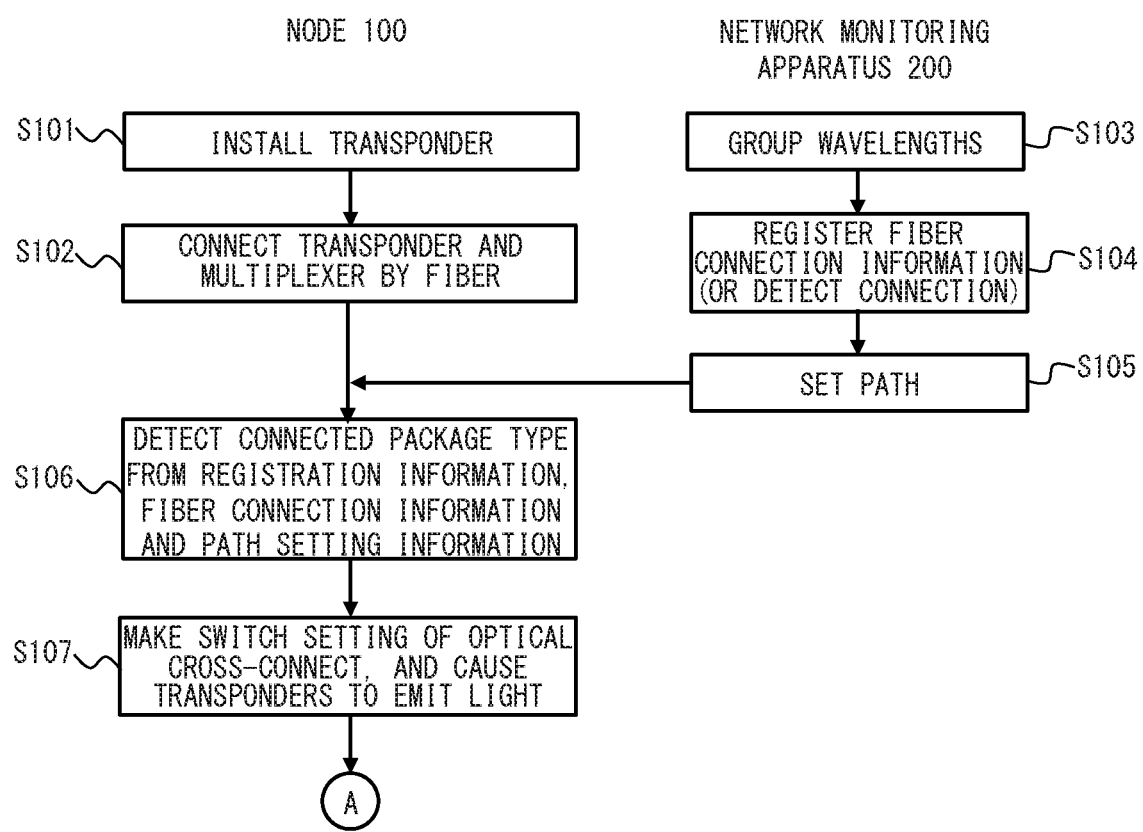
FIG. 14A is a flowchart illustrating an operation of a level correcting operation according to the second embodiment.
Figure 14B:
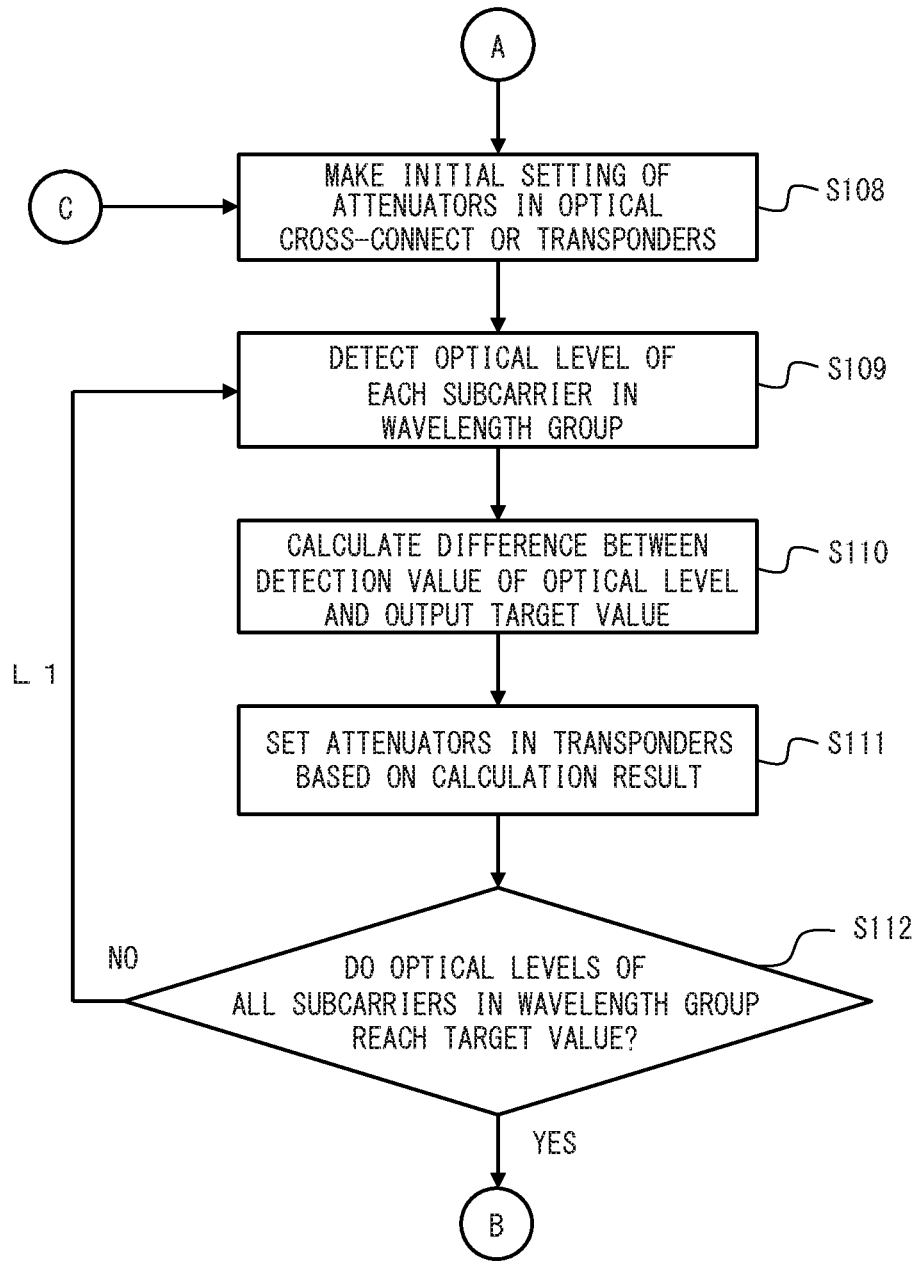
FIG. 14B is a flowchart illustrating the example of the level correcting operation according to the second embodiment.
Figure 14C:
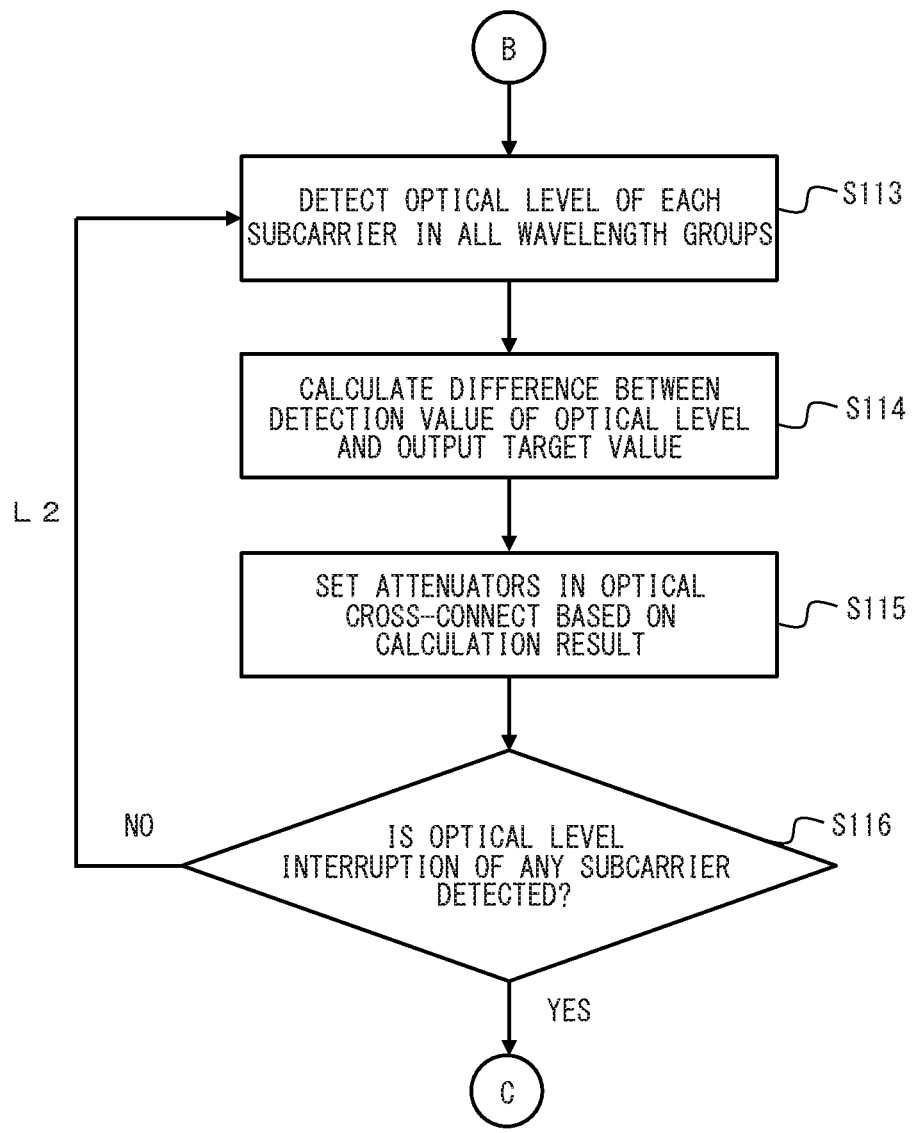
FIG. 14C is a flowchart illustrating the example of the level correcting operation according to the second embodiment.

FIGS. 14A to 14C illustrate a level correction method according to the present embodiment. Hereinafter, the level correction method will be described with reference to the configuration example of the node in FIG. 12 as an example.

As illustrated in FIGS. 14A to 14C, first, transponders are installed in the node 100 (S101), and the transponders and the multiplexers (multiplexers/demultiplexers) are connected by optical fibers (S102). For example, as illustrated in FIG. 12, a user of the node 100 connects the transponders 111 and 112 and the multiplexer 121 by the optical fibers F1 and F2, and connects the transponders 113 and 114 and the multiplexer 122 by the optical fibers F3 and F4.

Meanwhile, the network monitoring apparatus 200 groups wavelengths (S103). For example, the group specifying unit 201 of the network monitoring apparatus 200 groups subcarriers as wavelength groups according to a user's instruction, and set configurations of the wavelength groups and the subcarriers to use for SCH transmission.

Subsequently, the network monitoring apparatus 200 registers fiber connection information (or detects connection) (S104). For example, the connection information management unit 202 of the network monitoring apparatus 200 registers connection information indicating a connection relationship of each node 100 according to the user's instruction to enable path setting. Alternatively, the connection information management unit 202 may generate connection information based on information collected from each node 100.

Subsequently, the network monitoring apparatus 200 sets a path to the node 100 (S105). For example, the path setting unit 203 of the network monitoring apparatus 200 sets a path (e.g., a path in FIG. 3) between the nodes 100 for performing SCH transmission.

Subsequently, the node 100 detects a connected package type from the registration information, the fiber connection information and the path setting information (S106). For example, the initial setting unit 102a of the node control unit 102 detects a connection destination (connected package) of a fiber connected to each port of each package (the transponders, the multiplexers, the optical cross-connects, the optical input unit, the optical output unit and the like) from the fiber connection information (the connection information may be detected by the node itself) and the path setting information from the network monitoring apparatus 200 and the registration information of each package of the node 100.

Subsequently, the node 100 makes a switch setting of the optical cross-connect 130, and causes the transponders 111 to 114 to emit light (S107). For example, the initial setting unit 102a of the node control unit 102 sets wavelength switching (an input/output relationship matching the wavelength) of the wavelength selection switch 131 from the registration information, the fiber connection information and the path setting information.

Subsequently, the node 100 makes initial settings of the variable optical attenuators VOA in the optical cross-connect 130 and (or) the transponders 111 to 114 based on a detection result in S106 such that an optical output per carrier of the own package reaches a desired value (S108). For example, the initial setting unit 102a of the node control unit 102 makes the initial setting of the variable optical attenuators VOA (subcarrier units) inside the detected connection destination package such that a level of an optical output in the detected connection destination package reaches the desired value. That is, the initial setting unit 102a makes the initial setting of attenuation amounts of the variable optical attenuators VOA1 of the transponders 111 to 114, the variable optical attenuators VOA2 of the multiplexer 121 and the variable optical attenuators VOA3 of the optical cross-connect 130 such that the optical level of the SCH signal S0 outputted from the optical output unit 142 reaches the desired value.

Next, pre-multiplexing level correction processing (first correction processing) is executed in a loop L1 (first loop) in S109 to S112. According to the pre-multiplexing level correction processing, the node 100 first causes the optical channel monitor OCM to detect the optical level of each subcarrier in the wavelength group (S109).

Subsequently, the node 100 calculates a difference between the optical level of each subcarrier detected in S109 and an output target value (S110), and sets the variable optical attenuators VOA in the transponders 111 to 114 based on the difference such that the optical level of each subcarrier reaches the output target value (S111). In this case, the difference may be notified to the transponders. For example, the level correction unit 102b of the node control unit 102 calculates the difference between the optical level of each subcarrier in the wavelength group monitored by the optical channel monitor OCM and the output target value, and notifies the corresponding transponders 111 to 114 (and the multiplexer 121) of the difference. The transponders 111 to 114 (or the level correction unit 102b) set the attenuation amounts of the variable optical attenuators VOA1 in the transponders 111 to 114 (and the variable optical attenuators VOA2 of the multiplexer 121) based on the notified difference such that the optical level of each subcarrier reaches the output target value.

Subsequently, the node 100 determines whether or not optical levels of all subcarriers in the wavelength group have reached the target value (S112). For example, the level correction unit 102b of the node control unit 102 determines whether or not the optical levels of the subcarriers in each wavelength group monitored by the optical channel monitor OCM have reached the target value (or are included in a target range). The level correction unit 102b finishes the loop L1 (pre-multiplexing level correction processing) subsequent to S109 in a case where the optical levels have reached the target value, and repeats the loop L1 in a case where the optical levels do not reach the target value. For example, the level correction unit 102b performs level correction until the subcarrier signals S1_1 and S1_2 in the wavelength group signal S2_1 reach the target value and the subcarrier signals S1_3 and S1_4 in the wavelength group signal S2_2 reach the target value (the subcarrier signals in each wavelength group of the wavelengths f3 and f4 reach the target value in the example in FIG. 13).

Next, post-multiplexing level correction processing (second correction processing) is executed in a loop L2 (second loop) in S113 to S116. According to the post-multiplexing level correction processing, when the first loop ends, the node 100 first causes the optical channel monitor OCM to detect an optical level of each subcarrier of all wavelength groups (S113).

Subsequently, the node 100 calculates the difference between the optical level of each subcarrier in the wavelength group detected in S113 and the output target value (S114), and sets the variable optical attenuators VOA in the optical cross-connect 130 (wavelength selection switch 131) based on the difference such that the optical level of each subcarrier reaches the output target value (S115). In this case, the difference may be notified to the optical cross-connect. For example, the level correction unit 102b of the node control unit 102 calculates the difference between the optical level of each subcarrier in all wavelength groups monitored by the optical channel monitor OCM and the output target value, and notifies the optical cross-connect 103 of the difference. The optical cross-connect 130 (or the level correction unit 102b) sets attenuation amounts of the variable optical attenuators VOA3 for subcarriers in the corresponding wavelength groups in the optical cross-connect 130 (wavelength selection switch 131) based on the notified difference such that the optical level of each subcarrier reaches the output target value. For example, the optical cross-connect 130 performs level correction such that the subcarrier signals S1_1 and S1_2 in the wavelength group signal S2_1, the subcarrier signals S1_3 and S1_4 in the wavelength group signal S2_2 and a subcarrier signal (SCH signal S4) in a wavelength group signal received from another node reach the target value (until the subcarrier signals in each wavelength group of the wavelengths f3, f4 and f1 in the example in FIG. 13 reach the target value).

Subsequently, the node 100 determines whether or not an optical level interruption of any subcarrier has been detected (S116). For example, the level correction unit 102b of the node control unit 102 determines whether or not an optical level interruption of a subcarrier is detected (the optical level is lower than a predetermined value), based on a monitoring result of the optical channel monitor OCM. The level correction unit 102b repeats the loop L2 (post-multiplexing level correction processing) subsequent to S113 when not detecting the optical level interruption, and finishes the loop L2, returns to S108 and resumes the pre-multiplexing level correction when detecting the optical level interruption. In this case, the warning unit 102c notifies the network monitoring apparatus 200 of the optical level interruption of the subcarrier.

Figure 15:
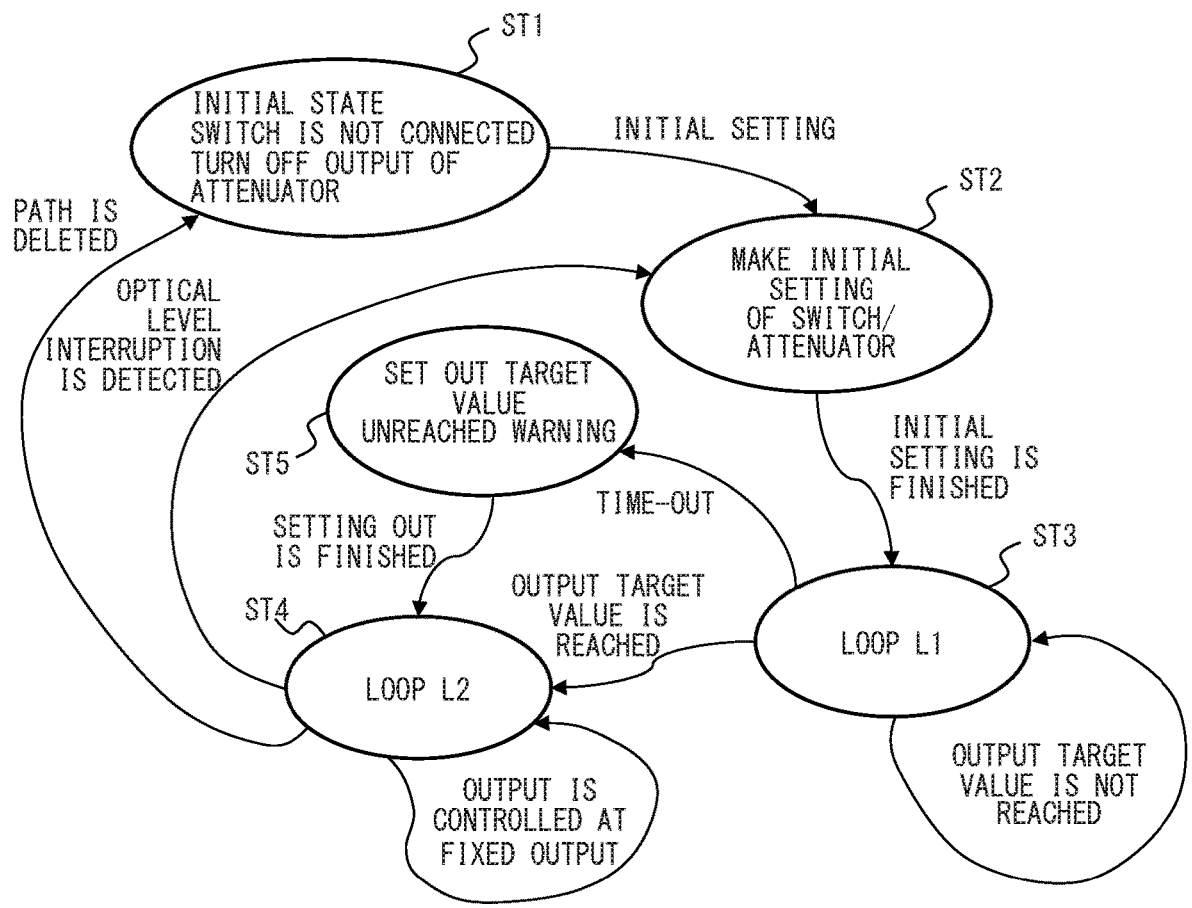
FIG. 15 is a state transition diagram illustrating an example of a state transition of the level correcting operation according to the second embodiment.

FIG. 15 illustrates a state transition of the level correction method according to the present embodiment illustrated in FIGS. 14A to 14C. First, a state ST1 is an initial state, and is a state where a switch is not connected and a variable optical attenuator output is OFF. When the initial setting (S101 to S105) is made in the state ST1, the state transitions to a state ST2.

An initial setting of an optical switch/optical attenuator is made in the state ST2 (S106 to S108), and, when the initial setting is finished in the state ST2, the state transitions to a state ST3. In the state ST3, loop L1 processing (pre-multiplexing level correction processing) is executed, and S109 to S112 are repeated until the output target value is reached. When the output target value is reached in the state ST3, the state transitions to a state ST4. In the state ST4, level L2 processing (post-multiplexing level correction processing) is executed, and S113 to S116 are repeated to maintain the output target value.

When time-out occurs in the state ST3 where the output target value is not reached, the state transitions to a state ST5. In the state ST5, a target value unreached waring is set out. When setting out the target value unreached warning is finished in the state ST5, the state transitions to the state ST4. That is, when a certain period passes after the initial setting is made and before the pre-multiplexing level correction processing is finished (the subcarriers reach a target level), the warning unit 102c outputs a warning, and starts the post-multiplexing level correction processing.

Furthermore, when the optical level interruption is detected (due to a failure) in the state ST4, the state returns to ST2. That is, when a failure occurs in a subcarrier at a time at which the post-multiplexing level correction processing is finished (or during the processing), the warning unit 102c outputs the warning, and resumes the pre-multiplexing level correction processing. Furthermore, when a path is deleted in the state ST4, the state returns to the state ST1. That is, when the path is deleted according to an instruction or the like from the network monitoring apparatus 200 at a time at which the post-multiplexing level correction processing is finished (during the processing), the pre-multiplexing level correction processing is resumed.

As described above, similar to the first embodiment, according to the present embodiment, the output unit of the node monitors optical levels of wavelength group signals (subcarrier signals), and performs level correction based on a monitoring result. First, according to the pre-multiplexing level correction, optical levels of the transponders and the multiplexers are controlled such that subcarrier signals in the wavelength groups reach a certain level. Furthermore, according to the post-multiplexing level correction, the optical level of the optical cross-connect (wavelength selection switch) is controlled such that subcarrier signals in all wavelength groups reach a certain level. Consequently, it is possible to precisely correct level deviations between wavelength groups and correct level deviations between subcarriers in the wavelength groups, so that it is possible to improve transmission characteristics.

Note that the present disclosure is not limited to the above embodiments, and modifications can be made as appropriate without departing from the scope of the present disclosure.

Each component (the optical transmission apparatus and the network monitoring apparatus) according to the above embodiment may be constituted by hardware, software or both, may be constituted by one hardware or software or may be constituted by a plurality of hardware or software. Each function (each processing) of a radio apparatus may be realized by a computer including a CPU, a memory and the like. For example, a program for performing the level correction method according to the embodiment may be stored in a storage apparatus to realize each function when the CPU executes the program stored in the storage apparatus.

Further, this program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

The whole or part of the exemplary embodiments disclosed above can be described as, but not limited to, the following supplementary notes.

(Supplementary Note 1)

An optical transmission apparatus comprising:

multiplexing means for multiplexing a plurality of subcarrier signals for performing optical wavelength multiplexing communication into a wavelength group signal;

output means for outputting the multiplexed wavelength group signal to an optical transmission line;

pre-multiplexing level correction means for correcting a level deviation between the subcarrier signals before the multiplexing based on an optical level of the wavelength group signal in the output means; and post-multiplexing level correction means for correcting a level deviation of the wavelength group signal after the multiplexing including the corrected subcarrier signals based on the optical level of the wavelength group signal in the output means.

(Supplementary Note 2)

The optical transmission apparatus according to Supplementary note 1, wherein the pre-multiplexing level correction means corrects the level deviation between the subcarrier signals based on an optical level of each subcarrier signal in the wavelength group signal.

(Supplementary Note 3)

The optical transmission apparatus according to Supplementary note 2, wherein the pre-multiplexing level correction means corrects the optical level of each subcarrier signal so that optical levels of all subcarrier signals in the wavelength group signal reach a target level.

(Supplementary Note 4)

The optical transmission apparatus according to any one of Supplementary notes 1 to 3, wherein, when a certain period passes until the correction of the level deviation between the subcarrier signals before the multiplexing is finished after an initial setting is made on optical levels of the subcarrier signals, the post-multiplexing level correction means starts correcting the level deviation of the wavelength group signal.

(Supplementary Note 5)

The optical transmission apparatus according to any one of Supplementary notes 1 to 4, further comprising a plurality of optical transmission means for generating the plurality of subcarrier signals and outputting the plurality of generated subcarrier signals to the multiplexing means, wherein the pre-multiplexing level correction means corrects optical levels of the subcarrier signals in the optical transmission means or the multiplexing means.

(Supplementary Note 6)

The optical transmission apparatus according to any one of Supplementary notes 1 to 5, wherein the post-multiplexing level correction means corrects the level deviation of the wavelength group signal including the subcarrier signals based on an optical level of each subcarrier signal in the wavelength group signal.

(Supplementary Note 7)

The optical transmission apparatus according to Supplementary note 6, wherein the post-multiplexing level correction means corrects the optical levels of the subcarrier signals so that the optical levels of all of the subcarrier signals in the wavelength group reach a target level.

(Supplementary Note 8)

The optical transmission apparatus according to any one of Supplementary notes 1 to 7, wherein, when an optical level interruption of one of the subcarrier signals of the wavelength group signal is detected after the correction of the level deviation of the wavelength group signal is finished, the pre-multiplexing level correction means resumes the correction of the level deviation between the subcarrier signals.

(Supplementary Note 9)

The optical transmission apparatus according to any one of Supplementary notes 6 to 8, further comprising optical switch means connected between the multiplexing means and the output means, for switching the multiplexed wavelength group signal, wherein the post-multiplexing level correction means corrects the optical levels of the subcarrier signals in the wavelength group signal in the optical switch means.

(Supplementary Note 10)

The optical transmission apparatus according to Supplementary note 9, wherein the optical switch means outputs a plurality of the wavelength group signals to the output means, and the post-multiplexing level correction means corrects the optical levels of the subcarrier signals in the plurality of wavelength group signals in the optical switch means.

(Supplementary Note 11)

A method for controlling an optical transmission apparatus that comprises:

multiplexing means for multiplexing a plurality of subcarrier signals for performing optical wavelength multiplexing communication into a wavelength group signal; and output means for outputting the multiplexed wavelength group signal to an optical transmission line, the method comprising:

correcting a level deviation between the subcarrier signals before the multiplexing based on an optical level of the wavelength group signal in the output means; and correcting the level deviation of the wavelength group signal after the multiplexing including the corrected subcarrier signals based on the optical level of the wavelength group signal in the output means.

(Supplementary Note 12)

The method for controlling the optical transmission apparatus according to Supplementary note 11, wherein the correcting the level deviation before the multiplexing corrects the level deviation between the subcarrier signals based on an optical level of each subcarrier signal in the wavelength group signal.

(Supplementary Note 13)

The method for controlling the optical transmission apparatus according to Supplementary note 11 or 12, wherein the optical transmission apparatus further comprises a plurality of optical transmission means for generating the plurality of subcarrier signals and outputting the plurality of generated subcarrier signals to the multiplexing means, and the correcting the level deviation before the multiplexing corrects optical levels of the subcarrier signals in the optical transmission means or the multiplexing means.

(Supplementary Note 14)

The method for controlling the optical transmission apparatus according to any one of Supplementary notes 11 to 13, wherein the correcting the level deviation after the multiplexing corrects the level deviation of the wavelength group signal including the subcarrier signals based on an optical level of each subcarrier signal in the wavelength group signal.

(Supplementary Note 15)

The method for controlling the optical transmission apparatus according to any one of Supplementary notes 11 to 14, wherein the optical transmission apparatus comprises optical switch means connected between the multiplexing means and the output means, for switching the multiplexed wavelength group signal, and the correcting the level deviation after the multiplexing corrects the optical levels of the subcarrier signals in the wavelength group signal in the optical switch means.

This application claims priority to Japanese Patent Application No. 2016-055632 filed on Mar. 18, 2016, the entire contents of which are incorporated by reference herein.

REFERENCE SIGNS LIST

1 OPTICAL TRANSMISSION SYSTEM
2 WDM NETWORK
3 MANAGEMENT NETWORK
10 NODE
11 MULTIPLEXING UNIT
12 OUTPUT UNIT

13 PRE-MULTIPLEXING LEVEL CORRECTION UNIT
14 POST-MULTIPLEXING LEVEL CORRECTION UNIT
100 NODE
101 OPTICAL TRANSMISSION UNIT
102 NODE CONTROL UNIT
102a INITIAL SETTING UNIT
102b LEVEL CORRECTION UNIT
102c WARNING UNIT
111 to 114 TRANSPONDER
121 to 233 MULTIPLEXER
130 OPTICAL CROSS-CONNECT
131 WAVELENGTH SELECTION SWITCH
141 OPTICAL INPUT UNIT
142 OPTICAL OUTPUT UNIT
200 NETWORK MONITORING APPARATUS
201 GROUP SPECIFYING UNIT
202 CONNECTION INFORMATION MANAGING UNIT
203 PATH SETTING UNIT
AG MULTIPLEXER
AMP1, AMP2 OPTICAL AMPLIFIER
CA OPTICAL AMPLIFIER
F1 to F8 OPTICAL FIBER
OCM OPTICAL CHANNEL MONITOR
OL OPTICAL TRANSMISSION LINE
S0, S3, S4 SCH SIGNAL
S1 SUBCARRIER SIGNAL
S2 WAVELENGTH GROUP SIGNAL
TPND TRANSPONDER
TX LASER
VOA1 to VOA3 VARIABLE OPTICAL ATTENUATOR
WSS WAVELENGTH SELECTION SWITCH
XF OPTICAL CROSS-CONNECT

The invention claimed is:

1. An optical transmission apparatus communicably coupled to a remote optical transmission apparatus, comprising:
a multiplexer configured to multiplex a plurality of subcarrier signals for performing optical wavelength multiplexing communication into a wavelength group signal;
an output interface configured to output the multiplexed wavelength group signal to an optical transmission line;
a first attenuator configured to adjust a level deviation of the subcarrier signals before the multiplexing based on an optical level of the wavelength group signal in the output interface; and
a second attenuator configured to adjust, after the multiplexing, a ratio between a level of an other wavelength group signal received from the remote optical transmission apparatus and a level of the wavelength group signal including the adjusted subcarrier signals based on the optical level of the wavelength group signal in the output interface;
wherein the second attenuator is configured to adjust the ratio so as to reduce a difference between the level of the other wavelength group signal in the output interface and the level of the wavelength group signal in the output interface, and
wherein, when an optical level interruption of one of the subcarrier signals of the wavelength group signal is detected after an adjustment of a level deviation between the other wavelength group signal and the wavelength group signal is finished, the first attenuator resumes the adjustment of the level deviation between the subcarrier signals.

2. The optical transmission apparatus according to claim 1, wherein the first attenuator adjusts the level deviation between the subcarrier signals based on an optical level of each subcarrier signal in the wavelength group signal.

3. The optical transmission apparatus according to claim 2, wherein the first attenuator adjusts the optical level of each subcarrier signal so that optical levels of all subcarrier signals in the wavelength group signal reach a target level.

4. The optical transmission apparatus according to claim 1, wherein, when a certain period passes until an adjustment of the level deviation between the subcarrier signals before the multiplexing is finished after an initial setting is made on optical levels of the subcarrier signals, the second attenuator starts adjusting the level deviation between the wavelength group signal and the other wavelength group signal.

5. The optical transmission apparatus according to claim 1, further comprising a plurality of optical transmission circuits configured to generate the plurality of subcarrier signals and outputting the plurality of generated subcarrier signals to the multiplexer,
wherein the first attenuator adjusts optical levels of the subcarrier signals in the optical transmission circuits or the multiplexer.

6. The optical transmission apparatus according to claim 1, wherein the second attenuator adjusts the ratio between the level of the other wavelength group signal and the level of the wavelength group signal including the subcarrier signals based on an optical level of each subcarrier signal in the wavelength group signal.

7. The optical transmission apparatus according to claim 6, wherein the second attenuator adjusts the optical levels of the subcarrier signals so that the optical levels of all of the subcarrier signals in the wavelength group reach a target level.

8. The optical transmission apparatus according to claim 6, further comprising an optical switch circuit connected between the multiplexer and the output interface, and configured to switch the multiplexed wavelength group signal,
wherein the second attenuator adjusts the optical levels of the subcarrier signals in the wavelength group signal in the optical switch circuit.

9. The optical transmission apparatus according to claim 8, wherein
the optical switch circuit outputs a plurality of the wavelength group signals to the output interface, and
the second attenuator adjusts the optical levels of the subcarrier signals in the plurality of wavelength group signals in the optical switch circuit.

10. The optical transmission apparatus according to claim 1, wherein the other wavelength group signal is transmitted in the optical transmission line.

11. The optical transmission apparatus according to claim 1, wherein, after the multiplexing, the other wavelength group signal is multiplexed with the wavelength group signal including the adjusted subcarrier signals.

12. The optical transmission apparatus according to claim 1, wherein a wavelength of the other wavelength group signal is different from a wavelength of the wavelength group signal including the adjusted subcarrier signals.

13. A method for controlling an optical transmission apparatus communicably coupled to a remote optical transmission apparatus, that comprises:
a multiplexer configured to multiplex a plurality of subcarrier signals for performing optical wavelength multiplexing communication into a wavelength group signal; and an output interface configured to output the multiplexed wavelength group signal to an optical transmission line, the method comprising:

adjusting a level deviation between the subcarrier signals before the multiplexing based on an optical level of the wavelength group signal in the output interface;

after the multiplexing, adjusting a ratio between a level of an other wavelength group signal received from the remote optical transmission apparatus and a level of the wavelength group signal including the adjusted subcarrier signals based on the optical level of the wavelength group signal in the output interface;

after the multiplexing, adjusting the ratio so as to reduce a difference between the level of the other wavelength group signal in the output interface and the level of the wavelength group signal in the output interface, and when an optical level interruption of one of the subcarrier signals of the wavelength group signal is detected after an adjustment of a level deviation between the other wavelength group signal and the wavelength group signal is finished, adjusting the level deviation between the subcarrier signals.

14. The method for controlling the optical transmission apparatus according to claim 13, wherein the adjusting the level deviation before the multiplexing adjusts the level deviation between the subcarrier signals based on an optical level of each subcarrier signal in the wavelength group signal.

15. The method for controlling the optical transmission apparatus according to claim 13, wherein the optical transmission apparatus further comprises a plurality of optical transmission circuits for generating the plurality of subcarrier signals and outputting the plurality of generated subcarrier signals to the multiplexer, and the adjusting the level deviation before the multiplexing adjusts optical levels of the subcarrier signals in the optical transmission circuits or the multiplexer.

16. The method for controlling the optical transmission apparatus according to claim 13, wherein the adjusting the ratio after the multiplexing adjusts the ratio between the level of the other wavelength group signal and the level of the wavelength group signal including the subcarrier signals based on an optical level of each subcarrier signal in the wavelength group signal.

17. The method for controlling the optical transmission apparatus according to claim 13, wherein the optical transmission apparatus comprises an optical switch circuit connected between the multiplexer and the output interface, for switching the multiplexed wavelength group signal, and the adjusting the level deviation after the multiplexing adjusts the optical levels of the subcarrier signals in the wavelength group signal in the optical switch circuit.

18. An optical transmission apparatus comprising:

a multiplexer configured to multiplex a first plurality of subcarrier signals for performing optical wavelength multiplexing communication into a first wavelength group signal;

a first optical interface configured to receive a second wavelength group signal from a remote optical transmission apparatus on a first optical transmission line, wherein the second wavelength group signal comprises a second plurality of multiplexed subcarrier signals;

a second optical interface configured to output a combined optical signal comprising the first wavelength group signal and the second wavelength group signal to a second optical transmission line;

a first attenuator configured to adjust a level deviation of the first plurality of subcarrier signals, before the multiplexer multiplexes the first plurality of subcarrier signals, based on an optical level of the first wavelength group signal in the second optical interface; and a second attenuator configured to adjust a ratio between a level of the second wavelength group signal and a level of the first wavelength group signal, after the multiplexer multiplexes the first plurality of subcarrier signals into the first wavelength group signal based on the optical level of the first wavelength group signal and the second wavelength group signal in the second optical interface;

wherein the second attenuator is configured to adjust the ratio so as to reduce a difference between the level of the first wavelength group signal in the output interface and the level of the second wavelength group signal in the output interface, and wherein, when an optical level interruption of one of the subcarrier signals of the first wavelength group signal is detected after an adjustment of a level deviation between the second wavelength group signal and the first wavelength group signal is finished, the first attenuator resumes the adjustment of the level deviation between the subcarrier signals.

19. An optical transmission apparatus comprising:

a multiplexer configured to multiplex a first plurality of subcarrier signals into a first wavelength group signal;

a first optical interface configured to output a combined optical signal for performing super channel transmission to a first optical transmission line, wherein the combined optical signal comprises the first wavelength group signal and a second wavelength group signal comprising a second plurality of multiplexed subcarrier signals, and a first attenuator configured to adjust a level deviation of the first plurality of subcarrier signals, before the multiplexer multiplexes the first plurality of subcarrier signals, based on an optical level of the first wavelength group signal in a second optical interface; and a second attenuator configured to adjust a ratio between a level of the second wavelength group signal and a level of the first wavelength group signal, after the multiplexer multiplexes the first plurality of subcarrier signals into the first wavelength group signal based on the optical level of the first wavelength group signal and the second wavelength group signal;

wherein the second attenuator is configured to adjust the ratio so as to reduce a difference between the level of the first wavelength group signal in the output interface and the level of the second wavelength group signal in the output interface, and wherein, when an optical level interruption of one of the first plurality of subcarrier signals of the first wavelength group signal is detected after an adjustment of a level deviation between the second wavelength group signal and the first wavelength group signal is finished, the first attenuator resumes the adjustment of the level deviation between the first plurality of subcarrier signals.

20. The optical transmission apparatus of claim 19, wherein the second wavelength group signal is received from a remote optical transmission apparatus.

* * * * *